US011135932B2

(12) United States Patent
Ishida et al.

(10) Patent No.: US 11,135,932 B2
(45) Date of Patent: Oct. 5, 2021

(54) ELECTRIC CHARGING CONTROL DEVICE

(71) Applicant: Mitsubishi Electric Corporation, Tokyo (JP)

(72) Inventors: Yoshikazu Ishida, Tokyo (JP); Shozo Kanzaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 199 days.

(21) Appl. No.: 16/232,260

(22) Filed: Dec. 26, 2018

(65) Prior Publication Data
US 2019/0210481 A1 Jul. 11, 2019

(30) Foreign Application Priority Data

Jan. 11, 2018 (JP) .............................. JP2018-002361

(51) Int. Cl.
*B60L 53/62* (2019.01)
*B60L 53/22* (2019.01)
*B60L 53/16* (2019.01)
*H02J 7/04* (2006.01)

(52) U.S. Cl.
CPC .............. *B60L 53/62* (2019.02); *B60L 53/16* (2019.02); *B60L 53/22* (2019.02); *H02J 7/045* (2013.01)

(58) Field of Classification Search
CPC B60L 53/62; B60L 53/22; B60L 53/16; H02J 7/04; H02J 7/045
USPC ........................................................ 320/107
See application file for complete search history.

(56) References Cited

U.S. PATENT DOCUMENTS

| 4,279,230 A * | 7/1981 | Bauer ................ F02D 35/0053 |
| | | 123/680 |
| 5,420,494 A * | 5/1995 | Lu .......................... H02J 7/022 |
| | | 320/138 |
| 8,791,681 B2 * | 7/2014 | Akaishi ................... H02M 7/48 |
| | | 323/288 |
| 2006/0071618 A1 * | 4/2006 | Yudahira ............... B60L 3/0023 |
| | | 318/12 |

(Continued)

FOREIGN PATENT DOCUMENTS

JP 2009-136110 A 6/2009
JP 2010-41794 A 2/2010

*Primary Examiner* — Richard Isla
*Assistant Examiner* — Dung V Bui
(74) *Attorney, Agent, or Firm* — Sughrue Mion, PLLC; Richard C. Turner

(57) ABSTRACT

An electric charging control device is obtained which detects welding abnormality of an electric contactor(s) along charging passages from an electric charging plug reaching a main battery; electric charging contactors and main electric contactors are connected in series; a first voltage monitoring circuit connected between power-supply points P1 and N1, a second voltage monitoring circuit connected therebetween, and a voltage-level detection circuit connected between the midpoints P2 and N2 are provided for producing a first voltage detection signal DET1, a second voltage detection signal DET2, and a main voltage detection signal DET0, each of which is a respective determination logic signal responding to the presence or absence of a monitored voltage; and a test voltage is received from either one of the main battery and a ground-based electric charging power-source apparatus, so that the presence or absence of welding abnormality in any one of the contactors is determined.

10 Claims, 14 Drawing Sheets

(56) References Cited

U.S. PATENT DOCUMENTS

| | | | | |
|---|---|---|---|---|
| 2012/0299477 A1* | 11/2012 | Kambara | ............... | H05B 45/50 |
| | | | | 315/82 |
| 2012/0319648 A1* | 12/2012 | Ohtomo | ................. | B60L 50/66 |
| | | | | 320/109 |
| 2014/0103883 A1* | 4/2014 | Mitsutani | ................ | B60L 50/16 |
| | | | | 320/162 |
| 2014/0343776 A1* | 11/2014 | Ang | ........................ | B60L 58/18 |
| | | | | 701/22 |
| 2014/0355697 A1* | 12/2014 | Magin | ..................... | H04L 1/004 |
| | | | | 375/257 |
| 2015/0054517 A1* | 2/2015 | Yonezaki | .............. | B60L 3/0046 |
| | | | | 324/418 |
| 2015/0130414 A1* | 5/2015 | Izumi | ...................... | B60L 53/14 |
| | | | | 320/109 |
| 2015/0346282 A1* | 12/2015 | Jeon | .................. | G01R 31/3278 |
| | | | | 324/418 |
| 2016/0001766 A1* | 1/2016 | Mori | .................. | B60L 15/2045 |
| | | | | 701/22 |
| 2018/0006340 A1* | 1/2018 | Yamamoto | .............. | B60L 58/21 |

* cited by examiner

ELECTRIC CHARGING CONTROL DEVICE

BACKGROUND OF THE INVENTION

Field of the Invention

The present invention relates to an electric charging control device mounted in an on-vehicle charging passage for charging an onboard battery for use in an electric automotive vehicle from a ground-based electric power source, and in more particular to an electric charging control device, in an electric automotive vehicle whose driving motors are supplied with alternating-current (AC) voltages by means of main electric contactors and an inverter through from a main battery mounted aboard an automotive vehicle, for charging the main battery with respect to a series-type charging passage from a ground-based electric charging power-source apparatus by way of a series-connected circuit constituting of an electric charging plug, electric charging contactors mounted on the automotive vehicle, and the main electric contactors mounted thereon.

DESCRIPTION OF THE RELATED ART

In an electric automotive vehicle having an electric charging function from a ground-based electric power source, there exist a type of ground-based electric charging power-source apparatus in which an onboard battery is charged by way of electric charging contactors, and that of ground-based electric charging power-source apparatus in which electric charging is performed in series by way of main electric contactors for use in motor driving; in each of the types, detection of abnormality of electric charging contactors and/or main electric contactors, in particular, detection of welding abnormality is made, and so, it is taking place that an energized and exposed portion of high voltage is not caused on an electric charging plug.

For example, according to an automotive vehicle drive apparatus as set forth in Patent Document 1, main relays being main electric contactors and electric charging relays being electric charging contactors are connected in series to each other, and are connected between an electric charging port and a driving battery; an intermediate point voltage to which an inverter circuit is connected is detected by means of a voltage sensor, and a power-supply point voltage near to the electric charging port is detected by means of voltage sensors.

And then, it is so arranged that, in a state in which a ground-based electric power source is not connected, the presence or absence of welding abnormality of the electric charging relays is determined by comparing an open-circuit/close-circuit instruction state of the electric charging relays each with a detection voltage of the voltage sensor, when an electric charging voltage of a smoothing capacitor within the inverter circuit gradually increases immediately after the main relays are close-circuited and the voltage reaches a system voltage V1 (for example, 60 V) or more, or when an electric charging voltage of the smoothing capacitor 11 gradually decreases after a predetermined time of open-circuiting the main relays 5a and 5b and the voltage reaches the system voltage V1 or less.

Note that, according to the description as set forth in Patent Document 1, it is so arranged that the abnormality determination is performed by means of a voltage sensor(s) through dedicated communication lines. According to this arrangement, a power-source voltage at the time of an abnormality inspection is lowered, so that it is stated that, without causing an influence of insulation resistance, accurate voltage detection can be performed.

In addition, according to an electric charging control device of an automotive vehicle as set forth in Patent Document 2, an electric energy storage device being a main battery mounted aboard an automotive vehicle supplies electric power to first and second motor generators by way of system main relays being main electric contactors, a buck/boost converter, and first and second inverters; and an electric power conversion apparatus being a ground-based electric charging power-source apparatus is connected to the energy storage device by way of an electric charging connector, and of relays being electric charging contactors, thereby revealing that, in the type of ground-based electric charging power-source apparatus, the main electric contactors and the electric charging contactors are not connected in series to each other.

And then, a control unit receives a positive-to-negative line voltage Vbat from a voltage sensor connected to the energy storage device, and receives a voltage V1 from a voltage sensor on an entrance side of the electric charging contactors, and a voltage V2 from a voltage sensor on an exit side thereof; and also, when a cover provided at an introduction opening of the electric charging connector is closed, it is so arranged that the presence or absence of abnormality of an electric charging circuit is determined based on the voltages Vbat, V1 and V2, and that, if there exists abnormality, the cover is fixed in a close state by means of a locking device so that a user cannot make contact with a connector on an automotive vehicle side.

[Patent Document 1] Japanese Patent Application Publication No. 2010-041794

[Patent Document 2] Japanese Patent Application Publication No. 2009-136110

An automotive vehicle drive apparatus according to Patent Document 1 described above is an apparatus for determining the presence or absence of abnormality of electric charging relays by using an electric charging voltage of a smoothing capacitor, and so, a voltage sensor is required to detect the presence or absence of a low voltage at a system voltage V1 or less.

Therefore, the voltage sensor is a sensor for performing voltage detection from a high-voltage range to a low-voltage range, and what is more, when the system voltage V1 is reduced in order to detect incomplete welding abnormality in which a voltage across contacts is large, there arises a problem in that detection of an infinitesimal voltage is required, so that an influence of insulation resistance is caused; and also, there arises a problem in that an expensive voltage sensor is required in order to detect a wide range of changes in voltage, and to produce an insulated output for inputting it into a central processing unit (CPU).

In addition, here, no supporting discussion with reasoning is made of performing inspection of the electric charging relays for a second time when a ground-based electric power source is connected to an electric charging port; however, in such a case, there arises a problem in that an influence is caused due to a pulsating change in an output voltage of a ground-based electric charging power-source apparatus, so that it is required to alter a setting value of the system voltage V1 for welding determination.

An electric charging control device of an automotive vehicle according to Patent Document 2 described above is arranged so that electric charging circuit's abnormality is determined which includes the presence or absence of disconnection abnormality of positive and negative power-source lines from an electric energy storage device reaching through to the relays being electric charging contactors, and the presence or absence of welding or disconnection abnormality of the relays; no supporting discussion with reasoning is made of performing inspection of the relays of the electric charging circuit for a second time when a ground-based electric power source is connected, nor made of performing abnormality determination of the system main relays.

In addition, when electric charging is completed from the ground-based electric power source, and in a case in which welding abnormality of the relays of the electric charging circuit has been caused at the time of open-circuiting the relays thereof, there arises a problem in that an energized and exposed portion is caused when unmating or extraction of the electric charging connector is performed.

Moreover, it is so arranged that a currently going value of detection voltages each of which is generated by voltage sensors is inputted into a control unit, and here, digital comparisons are performed with predetermined determination threshold-values Vth1, Vth2 and the like, so that there arises a problem in that, when values of the threshold-values Vth1 and Vth2 are set at low voltages suitable for welding detection, an expensive and highly accurate sensor is required for each of the voltage sensors.

SUMMARY OF THE INVENTION

The present invention has been directed at solving these problems described above, and an object of the invention is to provide an electric charging control device which is mounted in a charging passage for charging a main battery mounted aboard an automotive vehicle from a ground-based electric power source by way of a series-connected circuit constituting of an electric charging plug, electric charging contactors and main electric contactors, for detecting an occurrence of welding abnormality of an electric charging contactor(s) or that of a main electric contactor(s) by using an inexpensive and highly accurate voltage monitoring circuitry, and for preventing to cause an energized and exposedportion at the time of mating and unmating the electric charging plug.

An electric charging control device according to the present invention comprises an electric charging control CPU whose electric power is supplied from an auxiliary battery which has a lower voltage than that of a main battery, for serially connecting with respect to an upper-level control device which performs centralized control of an automotive electrical power conversion apparatus, and for constituting the automotive electrical power conversion apparatus including an inverter for supplying electric power of three-phase alternating-current voltages to a vehicle driving motor from the main battery mounted aboard an automotive vehicle, a pair of main electric contactors connected between the main battery and the inverter at an upstream position thereof and a downstream position thereof, and an electric motor control device operating with respect to the inverter, and also including a pair of electric charging contactors whose one ends each are connected with respect to an upstream power-supply point and a downstream power-supply point which are connected to an electric charging plug provided for an electric charging power-source apparatus being a ground-based device, and whose other ends being an upstream midpoint and a downstream midpoint are connected in series with the pair of main electric contactors. The electric charging control device for performing open-circuit/close-circuit control on at least one of the pair of main electric contactors and the pair of electric charging contactors is characterized in that: the upper-level control device further comprises an upper-level control CPU for performing mutual monitoring by means of a communications circuit between the electric charging power-source apparatus, an electric motor control CPU mounted on the electric motor control device, an electric charging instruction device for driving to close-circuit the pair of electric charging contactors, and the electric charging control CPU for driving the pair of main electric contactors, and for performing communications of a control signal therebetween; and the electric charging control CPU is connected to a first voltage monitoring circuit connected between the upstream power-supply point and either the downstream power-supply point N1 or the downstream midpoint, for producing a first voltage detection signal, and to a second voltage monitoring circuit connected between the downstream power-supply point N1 and either the upstream power-supply point or the upstream midpoint, for producing a second voltage detection signal.

And then, the electric charging control device is characterized in that: the first voltage monitoring circuit and the second voltage monitoring circuit produce the first voltage detection signal being a determination logic signal responding to the presence or absence of a monitored voltage and the second voltage detection signal being a determination logic signal responding to the presence or absence of the monitored voltage, respectively, and, when the first voltage monitoring circuit and the second voltage monitoring circuit are connected between the upstream power-supply point and the downstream power-supply point, a voltage monitoring circuitry is made by providing either one of the voltage monitoring circuits, or a voltage monitoring circuitry is made of a double system by providing both of the voltage monitoring circuits therefor; the inverter further comprises a voltage-level detection circuit for determining whether or not a main power-source voltage of a high voltage is applied from the main battery, and for producing a main voltage detection signal being a determination logic signal, and/or a determination-voltage detection signal by way of the electric motor control CPU by producing a voltage-level detection signal thereto; the upper-level control CPU comprises a control program constituting of a main contactor abnormality detection means executed in cooperation with the electric charging control CPU, a first electric charging contactor abnormality detection means executed in a state in which the pair of main electric contactors is close-circuited under a condition that the electric charging plug is not connected, and a second electric charging contactor abnormality detection means executed in a state in which the pair of main electric contactors is open-circuited under a condition that the electric charging plug is connected and electric power is supplied from the electric charging power-source apparatus; and the main contactor abnormality detection means is a means for distinguishably determining the presence or absence of welding abnormality of a main electric contactor or a contact defect thereof on a one-by-one basis, in a non-connection state of the electric charging plug, corresponding to a combination state of a drive instruction with respect to the pair of main electric contactors, and corresponding to a detection logic of a main voltage detection signal or a determination-voltage detection signal.

And also, the electric charging control device is characterized in that: the first electric charging contactor abnormality detection means is a means for distinguishably determining the presence or absence of welding abnormality of an electric charging contactor(s) or a contact defect thereof on a one-by-one basis corresponding to a combination state of a drive instruction with respect to the pair of electric charging contactors, and corresponding to a detection logic of the first voltage detection signal and that of the second voltage detection signal; the second electric charging contactor abnormality detection means either subsumes a detected-voltage abnormality determination means for determining whether or not a generated voltage of the electric charging power-source apparatus detected by the voltage-level detection circuit is within a predetermined threshold-value range being set in advance, or comprises a means for distinguishably determining the presence or absence of welding abnormality of an electric charging contactor(s) or a contact defect thereof on a one-by-one basis corresponding to at least a combination state of a drive instruction with respect to the pair of electric charging contactors, and a detection logic of a main voltage detection signal, or a detection logic of the first voltage detection signal and that of the second voltage detection signal; and a plug cover is mounted on a plug-in entrance of the electric charging plug, and, when the plug cover is open and the electric charging plug is not inserted, at least one pair of the main electric contactors and the electric charging contactors is configured not to be driven for close-circuiting, and is also configured to prohibit a close-circuit instruction with respect to at least the other pair, when there exists welding abnormality in any one contactor of the pair of electric charging contactors and the pair of main electric contactors.

The electric charging control device according to the present invention is a charging control device which is made to configure, with respect to a main battery mounted aboard an automotive vehicle for applying three-phase alternating-current voltages to vehicle driving motors of the automotive vehicle by means of main electric contactors and an inverter, a charging passage for electrically charging, by way of an electric charging plug, the main battery from an electric charging power-source apparatus being a ground-based facility. The charging control device is so arranged that: along the charging passage, a pair of electric charging contactors is mounted which is connected between respective positive and negative power-supply terminals of the electric charging plug, and positive and negative output terminals of the main electric contactors; and, using a voltage-level detection circuit for detecting the presence or absence of an intermediate voltage across the positive and negative output terminals, and using the first and/or second voltage monitoring circuits each for detecting the presence or absence of a power-supply voltage across the positive and negative power-supply terminals, the presence or absence of welding abnormality of the main electric contactors and the electric charging contactors, or that of a contact defect thereof is determined, so that, when the plug cover mounted on the plug-in entrance of the electric charging plug is open and the electric charging plug is not inserted, a close-circuit drive of the main electric contactors and that of the electric charging contactors are prohibited, and also that, when there exists welding abnormality in any one of the electric charging contactors and the main electric contactors, a close-circuit instruction with respect to at least the other is prohibited.

In addition, when the electric charging power-source apparatus is connected, the presence or absence of welding abnormality of the electric charging contactors or that of a contact defect thereof is determined by using a main voltage detection signal being a logic signal which makes low-voltage detection easy, and a first voltage detection signal and/or a second voltage detection signal; and, when the detected-voltage abnormality determination means is concurrently used, it is so arranged that the electric charging contactors and the main electric contactors can be open-circuited if a currently going voltage of the electric charging power-source apparatus detected by the voltage-level detection circuit is abnormal.

Therefore, abnormality determination of the main electric contactors and that of the electric charging contactors are performed in a state in which the plug cover is closed, so that it is possible to arrange that an energized and exposed portion is not caused, when the plug cover for mating and unmating an electric charging plug is released to be open; and also, the presence or absence of welding abnormality of the electric charging contactors or that of a contact defect thereof is determined for a second time when the electric charging plug is inserted, so that, by stopping an electric charging operation in such an abnormal state, an effect can also be achieved as preventing expansion of an abnormality occurrence.

Moreover, the abnormality determination is performed which is principally based on the main voltage detection signal or determination-voltage detection signal being a determination logic signal with respect to the presence or absence of a monitored voltage, and on the first voltage detection signal and/or the second voltage detection signal, so that there exists an effect that an abnormally low state of the monitored voltage being a high voltage is detected by a simple logic determination circuit, and incomplete welding abnormality can be detected.

BRIEF DESCRIPTION OF DRAWINGS

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
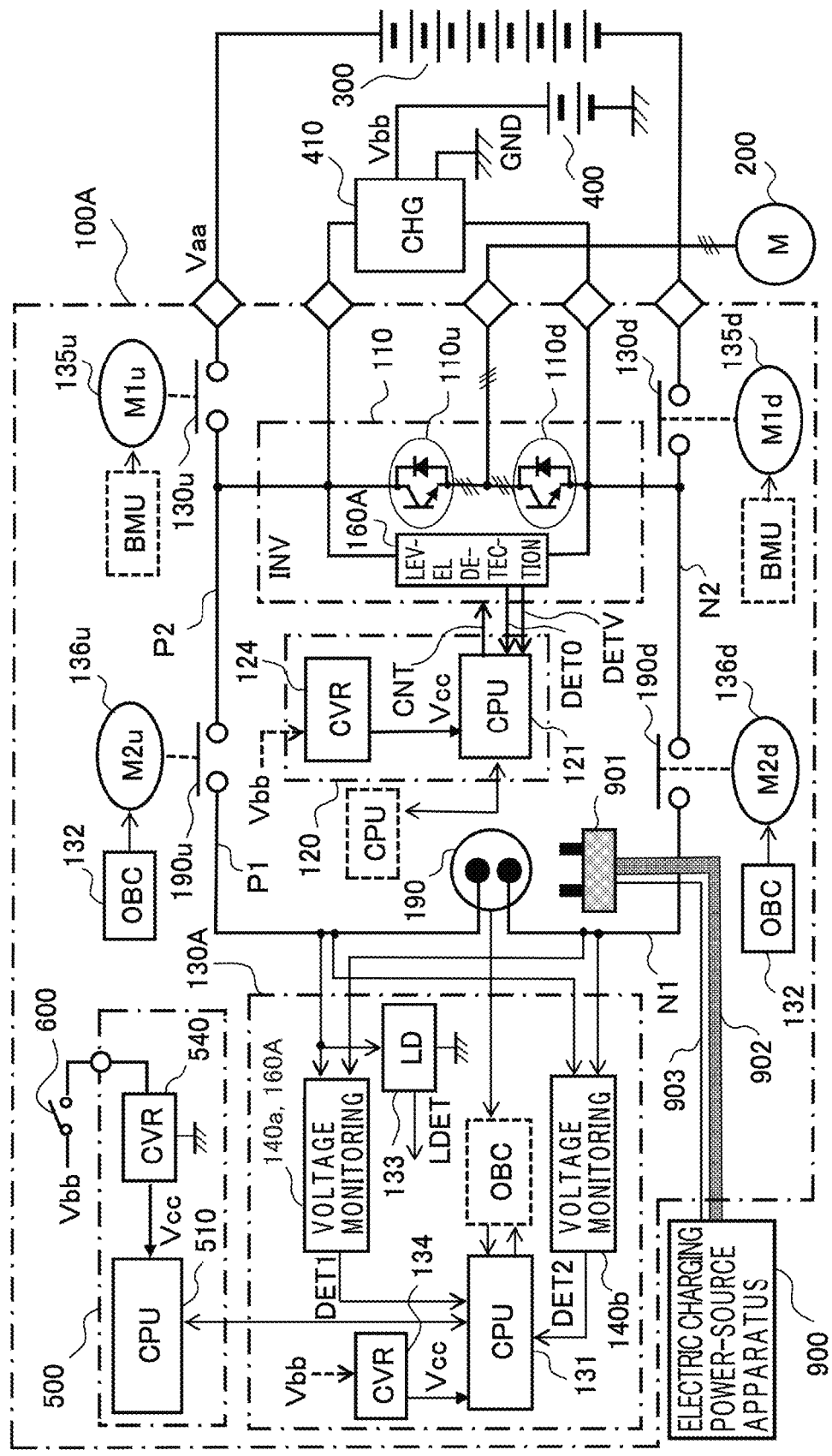
FIG. 1 is an overall circuit block diagram of an automotive electrical power conversion apparatus including an electric charging control device according to Embodiment 1 of the present invention.

Hereinafter, the embodiments of the present invent ion will be described in detail referring to the drawings. Note that, in each of the figures, the same reference numerals and symbols designate the same items as, or the items corresponding to, those shown in the drawings.

Embodiment 1

Hereinafter, the explanation will be made in more detail for the configurations referring to FIG. 1 that is an overall circuit block diagram of an automotive electrical power conversion apparatus including an electric charging control device according to Embodiment 1 of the present invention.

In FIG. 1, it is so arranged that, to the automotive electrical power conversion apparatus 100A, vehicle driving motors 200 are connected into which electric power is supplied through from a main battery 300 generating a main power-source voltage Vaa of, for example, DC 400 V to drive the vehicle driving motors by means of an inverter (abbreviated as an "INV") 110, and also that, to the apparatus, connected by means of an insulated-type step-down or buck charging device (abbreviated as a "CHG") 410 is an auxiliary battery 400 which is charged thereby through from the main battery 300, so that an auxiliary power-source voltage Vbb of, for example, a DC 12-volt system is generated. The apparatus is further arranged to include an upper-level control device (electronic control unit, abbreviated as an "ECU") 500 having an upper-level control CPU (processing device) 510 therein, and to connect an electric charging power-source apparatus 900 being a ground-based facility. Note that, when a power switch 600 of an automotive vehicle is turned on, the auxiliary power-source voltage Vbb is supplied to the upper-level control CPU 510, and so, it is arranged that electric power is supplied thereto by means of a stabilized power source (abbreviated as a "CVR") 540 for generating a stabilized voltage Vcc of DC 5 V, for example.

In addition, to the electric charging power-source apparatus 900, an electric charging plug 901 is connected by way of power-source lines 902 and a signal line 903; and the signal line 903 is a signal line through which transmitted to the upper-level control CPU 510 is a signal for detecting whether or not the electric charging plug 901 is connected to an electric charging plug entrance 190 on an automotive vehicle side, and for detecting whether or not a plug cover is closed under lock as will be described later.

The inverter (abbreviated as the "INV") 110 being a prime constituent element of the automotive electrical power conversion apparatus 100A includes upstream switch-on/switch-off devices 110u of three pairs and downstream switch-on/switch-off devices 110d thereof constituting a three-phase full-wave bridge circuit; to the inverter's series connection points, the vehicle driving motors (abbreviated as an "M") 200 are connected each being a three-phase synchronous motor; and the inverter's series upstream ends are connected to the positive electrode terminal of the main battery 300 by way of the upstream main contactor 130u, and the inverter's series downstream ends are connected to the negative electrode terminal of the main battery 300 by way of the downstream main contactor 130d.

Note that, the inverter 110 includes a voltage-level detection circuit 160A for measuring a currently going voltage between a positive power-source line and a negative power-source line as will be described later in FIG. 4, and also subsumes a motor current detection circuit, a turn-on/turn-off drive circuit of each of the switch-on/switch-off devices, a device abnormality detection circuit, and so forth not shown in the figures. An electric motor control device (abbreviated as an "MCU") 120 operating in collaboration with the inverter 110 includes an electric motor control CPU 121 for performing serial communications of control and monitoring signals between the CPU and the upper-level control device (abbreviated as an "ECU") 500, and a stabilized power source 124 into which electric power is supplied from the auxiliary battery 400 to generate a stabilized voltage Vcc, which is supplied into the electric motor control CPU 121.

In addition, it is so arranged that the electric motor control CPU 121 produces a control signal CNT for controlling conduction states of the upstream switch-on/switch-off devices 110u and the downstream switch-on/switch-off devices 110d by reacting in response to a driving instruction signal from the upper-level control CPU 510, and also that, by means of a voltage-level detection signal DETV in which the voltage-level detection circuit 160A produces, the electric motor control CPU measures a currently going value of a voltage between the positive power-source line and the negative power-source line where the voltage is applied across the inverter 110, and reads in a main voltage detection signal DET0 in which the voltage-level detection circuit 160A produces as will be described later, for transmitting the main voltage detection signal to an electric charging control CPU 131 as will be described later by way of the upper-level control CPU 510.

Meanwhile, an upstream electric-charging contactor 190u is connected between an upstream midpoint P2 being a series connection point with the upstream main contactor 130u, and an upstream power-supply point P1 which is connected to a positive power-source line of the electric charging power-source apparatus 900 by way of the electric charging plug 901.

Similarly, a downstream electric-charging contactor 190d is connected between a downstream midpoint N2 being a series connection point with the downstream main contactor 130d, and a downstream power-supply point N1 which is connected to a negative power-source line of the electric charging power-source apparatus 900 by way of the electric charging plug 901.

And then, it is so arranged that an energizing coil (M1u) 135u and an energizing coil (M1d) 135d of the upstream main contactor 130u and the downstream main contactor 130d can be individually driven to close-circuit the respective contactor by means of the electric charging control CPU 131 as will be described later, and that an energizing coil (M2u) 136u and an energizing coil (M2d) 136d of the upstream electric-charging contactor 190u and the downstream electric-charging contactor 190d can be individually driven to close-circuit the respective contactor by means of an electric charging instruction device (abbreviated as an "OBC") 132 to which an open-circuit/close-circuit instruction signal is transmitted from the upper-level control CPU 510.

An electric charging control device (abbreviated as a "BMU") 130A for performing open-circuit/close-circuit control on the upstream main contactor 130u and the downstream main contactor 130d includes the electric charging control CPU 131 for performing serial communications of control and monitoring signals between the CPU and the upper-level control device (abbreviated as an "ECU") 500, and a stabilized power source (abbreviated as a "CVR") 134 into which electric power is supplied from the auxiliary battery 400 to generate a stabilized voltage Vcc, which is supplied into the electric charging control CPU 131.

The electric charging control device 130A also includes either one of a first voltage monitoring circuit 140a or a second voltage monitoring circuit 140b, or both of the circuits connected between the upstream power-supply point P1 and the downstream power-supply point N1, it is so arranged that the voltage monitoring circuit produces a first voltage detection signal DET1 or a second voltage detection signal DET2 which is a logic signal for detecting the presence or absence of a line-to-line voltage depending on whether or not a voltage between a positive power-source line and a negative power-source line is a predetermined threshold-value voltage being set in advance or more.

In the electric charging control device 130A, an earth-leakage detection circuit (abbreviated as an "LD") 133 is also mounted for measuring the earth-leakage resistance between the upstream power-supply point P1 (or the downstream power-supply point N1 may also be suitable therefor) and the bodywork of an automotive vehicle; it is so arranged that, in accordance with the presence or absence of earth-leakage abnormality, an earth-leakage detection signal LDET is produced, which is transmitted to the upper-level control CPU 510.

It can be known that the electric charging instruction devices (abbreviated as the "OBC") 132 are remote terminals placed at positions close to the upstream electric-charging contactor 190u and the downstream electric-charging contactor 190d; however, when the electric charging contactors 190u and 190d are placed at positions close to the electric charging control device 130A, it may be adopted that the electric charging instruction devices 132 and the electric charging control device 130A are integrally made with one another, and the electric charging contactors 190u and 190d are directly driven from the electric charging control device 130A.

Meanwhile, when the main electric contactors 130u and 130d are placed at positions remote to the electric charging control device 130A, it may be adopted that remote terminals are mounted at positions immediately close to the main electric contactors 130u and 130d, which are driven to be open-circuited/close-circuited from the upper-level control CPU 510 or the electric charging control CPU 131.

In addition, in place of the first voltage monitoring circuit 140a or the second voltage monitoring circuit 140b, a first voltage monitoring circuit 150a of a voltage monitoring circuitry 150 shown in FIG. 3 or a second voltage monitoring circuit 150b thereof is applicable, respectively, or the voltage-level detection circuit 160A shown in FIG. 4 may also be applicable; this will be described later in FIG. 3 and FIG. 4.

Figure 2:
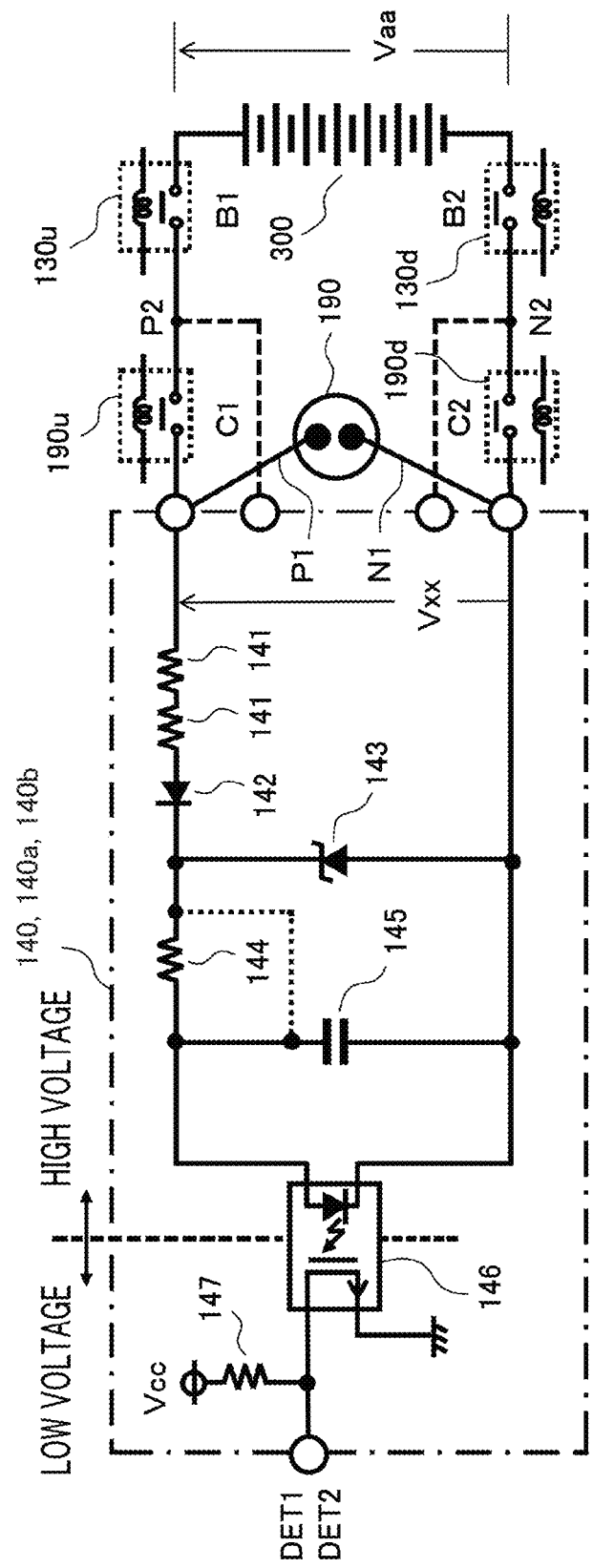
FIG. 2 is a circuit diagram illustrating a basic type of a voltage monitoring circuitry in the electric charging control device according to Embodiment 1 of the present invention.
Figure 3:
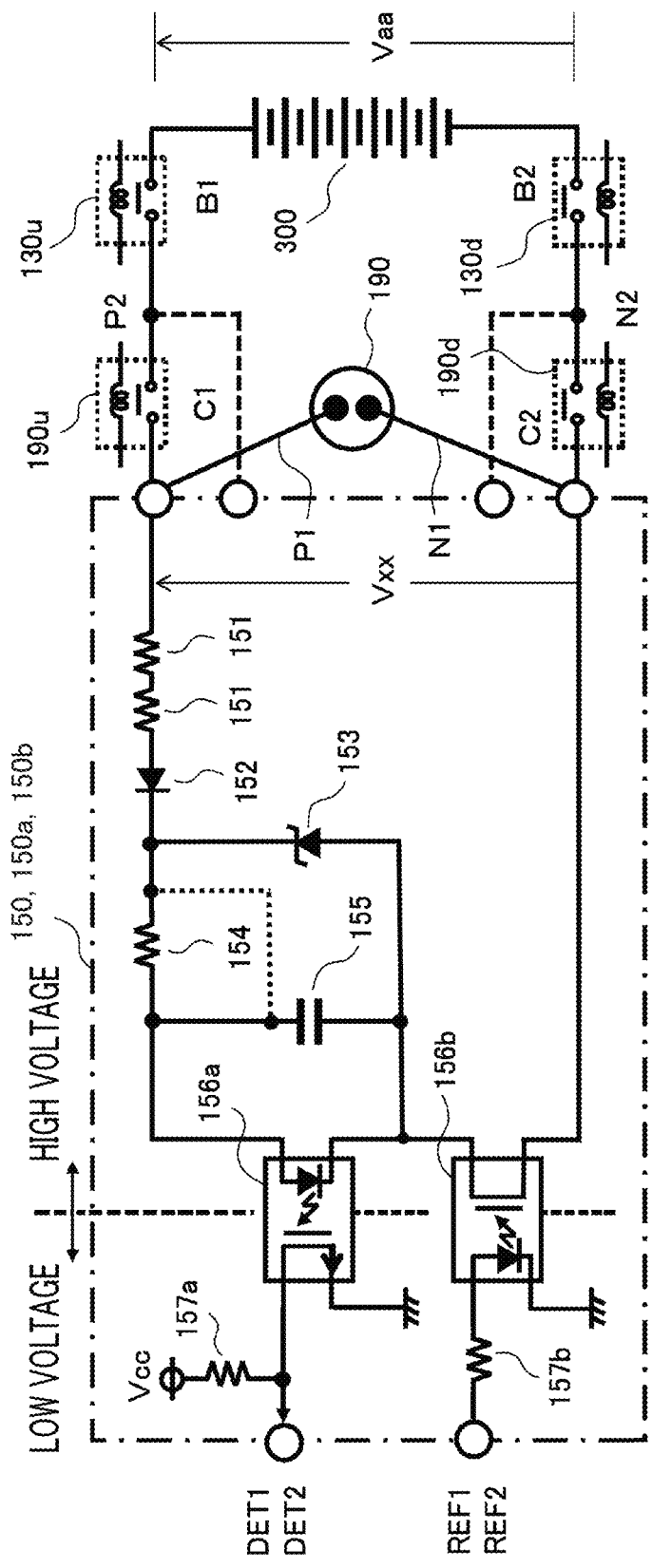
FIG. 3 is a circuit diagram illustrating a modification example of a voltage monitoring circuitry in the electric charging control device according to Embodiment 1 of the present invention.
Figure 4:
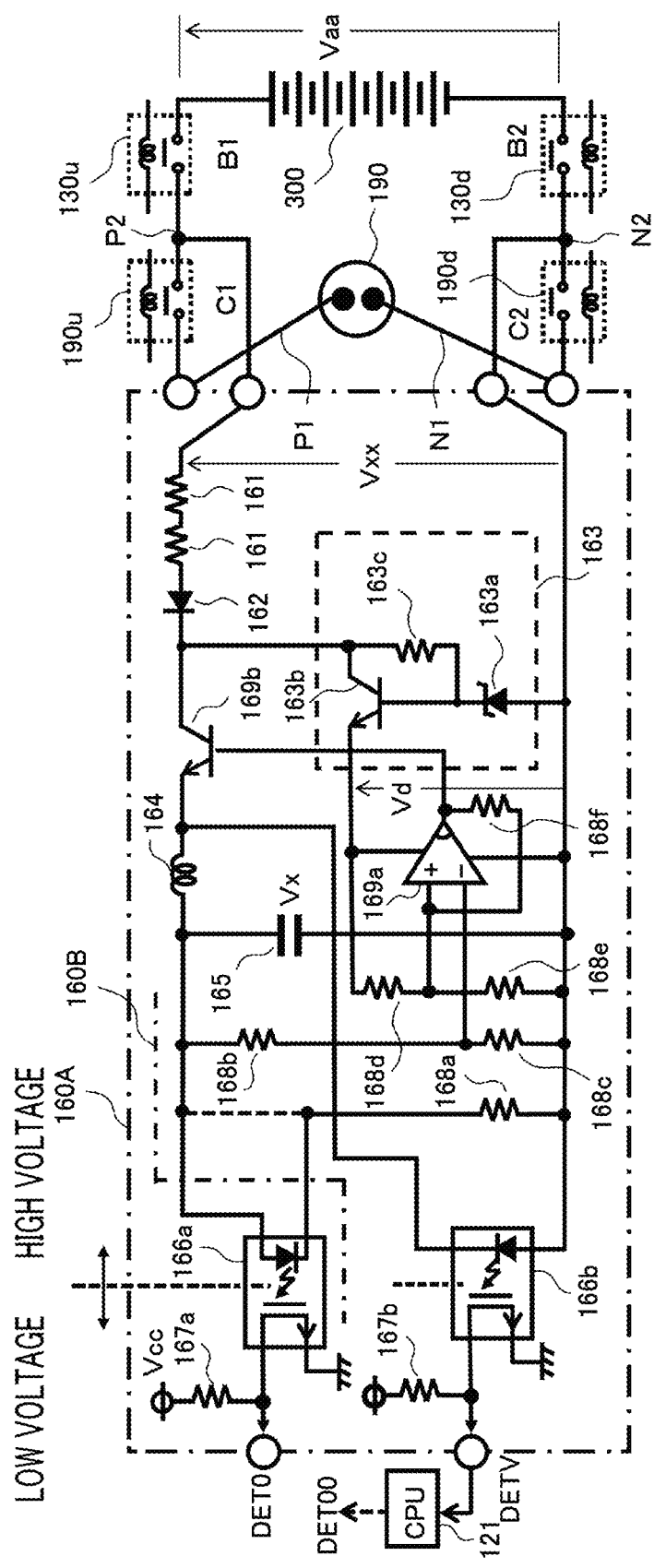
FIG. 4 is a circuit diagram illustrating a voltage-level detection circuit and its modification example in the electric charging control device according to Embodiment 1 of the present invention.
Figure 5:
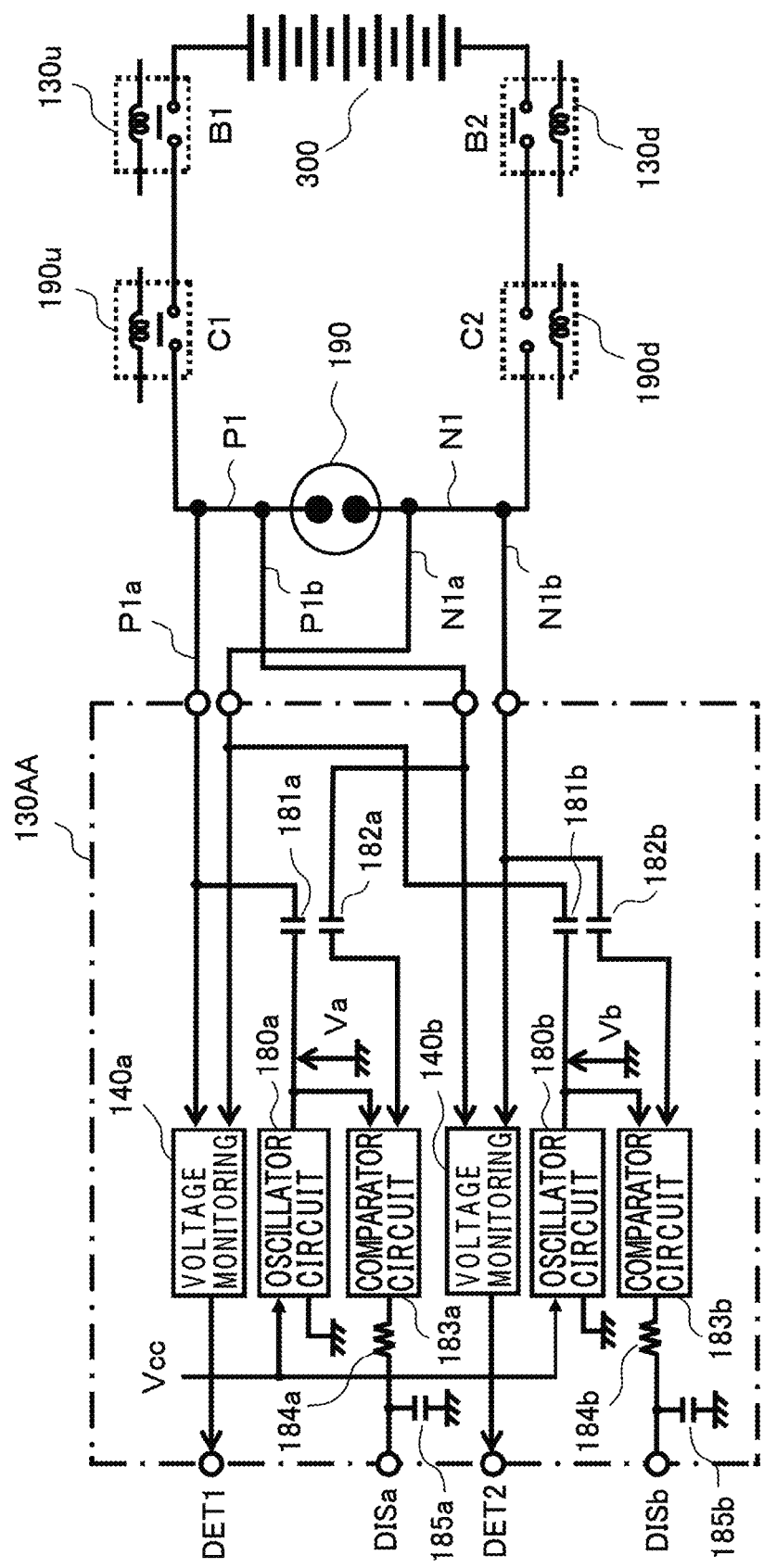
FIG. 5 is a circuit diagram illustrating disconnection detection circuits in the electric charging control device according to Embodiment 1 of the present invention.

Next, the explanation will be sequentially made in more detail for FIG. 2 being a circuit diagram of a basic type of a voltage monitoring circuitry in the electric charging control device (abbreviated as the "BMU") shown in FIG. 1, for FIG. 3 being a circuit diagram of a modification example of a voltage monitoring circuitry in the electric charging control device shown in FIG. 1, for FIG. 4 being a circuit diagram of a voltage-level detection circuit and its modification example in the electric charging control device shown in FIG. 1, and for FIG. 5 being a circuit diagram of disconnection detection circuits in the electric charging control device shown in FIG. 1.

In FIG. 2, the configuration of the first voltage monitoring circuit 140a and that of the second voltage monitoring circuit 140b are totally the same, so that, here, each of the circuits is referred to collectively as a "voltage monitoring circuitry 140."

The voltage monitoring circuitry 140 is connected between the upstream power-supply point P1 of the electric charging plug entrance 190 and the downstream power-supply point N1 thereof.

And then, the upstream power-supply point P1 is connected to the positive electrode terminal of the main battery 300 by way of the upstream electric-charging contactor 190u (abbreviated as an "electric charging upper contact C1") and the upstream main contactor 130u (abbreviated as a "main upper contact B1"); and the downstream power-supply point N1, connected to the negative electrode terminal of the main battery 300 by way of the downstream electric-charging contactor 190d (abbreviated as an "electric charging lower contact C2") and the downstream main contactor 130d (abbreviated as a "main lower contact B2").

Therefore, it can be known that a monitored voltage Vxx by means of the voltage monitoring circuitry 140 is either an electric charging output voltage of the electric charging power-source apparatus 900 shown in FIG. 1 connected by way of the electric charging plug 901, or a value in which an overall voltage drop ΔV due to contact resistance of each of the electric charging upper contact C1, the electric charging lower contact C2, the main upper contact B1 and the main lower contact B2 is subtracted from a main power-source voltage Vaa when the upper and lower contacts are close circuited.

In the voltage monitoring circuitry 140, the monitored voltage Vxx is applied thereto by way of a plurality of current-limiting resistors 141, a backflow blocking diode 142 and a zener or constant-voltage diode 143 which are connected in series with each other; with the constant-voltage diode 143, a light-emitting diode of a reception photocoupler 146 is connected in parallel by way of a series resistor 144; and, with respect to the light-emitting diode or to the constant-voltage diode 143, a smoothing capacitor 145 is connected in parallel. And then, to an output transistor of the reception photocoupler 146, a stabilized voltage Vcc is applied by way of a pull-up resistor 147; an output of the output transistor is inputted into the electric charging control CPU 131 shown in FIG. 1 as the first voltage detection signal DET1 or the second voltage detection signal DET2.

Note that, the circuit indicated with the dotted line in FIG. 2 is a circuit when the smoothing capacitor 145 is connected in parallel with respect to the constant-voltage diode 143.

For example, when a main power-source voltage Vaa=400 V, and when determination is made for the presence or absence of welding in the main lower contact B2 under the condition that the electric charging upper contact C1, the electric charging lower contact C2 and the main upper contact B1 are driven to be close-circuited and under the condition that the main lower contact B2 is not driven to be close-circuited, a monitored voltage Vxx=0 V, if the main lower contact B2 is normally open-circuited; else if abnormally complete welding is caused, the monitored voltage Vxx=400 V.

Here, as a premised requirement 1, it is presumed a case in which a monitored voltage Vxx=40 V, for example, due to incomplete welding; when an operating electric current of the reception photocoupler 146 is 10 mA in order to detect incomplete welding, and an operating voltage of the constant-voltage diode 143 therefor is 10 V, a combined resistance of the current-limiting resistors 141 becomes (40 V−10 V)/10 mA=3 kΩ, and losses caused in the voltage monitoring circuitry 140 as a whole become (40 V×10 mA)=0.4 W.

And then, when the main lower contact B2 is completely welded at a monitored voltage Vxx=400 V, and in a case in which the combined resistance of the current-limiting resistors 141 is 3 kΩ, an electric current flowing through the current-limiting resistors 141 becomes (400 V−10 V)/3 kΩ=130 mA, so that losses caused in the voltage monitoring circuitry 140 as a whole become (400 V×130 mA)=52 W.

Meanwhile, as a premised requirement 2, it is presumed a case in which a monitored voltage Vxx=310 V, for example due to incomplete welding; when the operating electric current of the reception photocoupler 146 is 10 mA in order to detect incomplete welding, and the operating voltage of the constant-voltage diode 143 therefor is 10 V, the combined resistance of the current-limiting resistors 141 becomes (310 V−10 V)/10 mA=30 kΩ, and losses caused in the voltage monitoring circuitry 140 as a whole become (310 V×10 mA)=3.1 W.

And then, when the main lower contact B2 is completely welded at the monitored voltage Vxx=400 V, and in a case in which the combined resistance of the current-limiting resistors 141 is 30 kΩ, an electric current flowing through the current-limiting resistors 141 becomes (400 V−10 V)/30 kΩ=13 mA, so that losses caused in the voltage monitoring circuitry 140 as a whole become (400 V×13 mA)=5.2 W.

Therefore, there results in causing that, under the premised requirement 1, overall losses of the voltage monitoring circuitry 140 become excessively large, and that, under the premised requirement 2, a state of incomplete welding which can be detected is remained unsolved.

For dealing therewith, it is so arranged that, according to a modification example of FIG. 3, the problems in a case of FIG. 2 are resolved in performance.

In FIG. 3, the numeral symbols of 140's in FIG. 2 are replaced by those of 150's, here. The symbol of the reception photocoupler 146 is altered to that of a reception photocoupler 156a, and the symbol of the pull-up resistor 147, to that of a pull-up resistor 157a; and the circuit indicated with the dotted line is a circuit when a smoothing capacitor 155 is connected in parallel with respect to a zener or constant-voltage diode 153.

In addition, a transmission photocoupler 156b is added, and a light-emitting diode of the reception photocoupler 156a, the smoothing capacitor 155 and the constant-voltage diode 153, being parallel with one another, are each connected in series toward a downstream connection point.

And then, it is so arranged that a light-emitting diode of the transmission photocoupler 156b is driven from a first reference signal REF1 or a second reference signal REF2 through a drive resistor 157b; and it is also arranged that the electric charging control CPU 131 shown in FIG. 1 produces the first reference signal REF1 or the second reference signal REF2 in a time-period for performing an abnormality inspection on the electric charging upper contact C1 and the electric charging lower contact C2, or the main upper contact B1 and the main lower contact B2, and that the voltage monitoring circuitry 150 is in a non-operating state at all other time-periods.

In FIG. 4 that is a circuit diagram illustrating a voltage-level detection circuit and its modification example of the apparatus shown in FIG. 1, the voltage-level detection circuit 160A includes a reception photocoupler 166a for producing the main voltage detection signal DET0 reacting in response to the presence or absence of a monitored voltage Vxx being a line-to-line voltage between the upstream midpoint P2 and the downstream midpoint N2, and an intermittent reception photocoupler 166b for producing the voltage-level detection signal DETV being a pulse signal of a frequency reacting in response to a currently going value of a monitored voltage Vxx.

In a voltage-level detection circuit 160B being a modification example to the voltage-level detection circuit 160A, the reception photocoupler 166a is cancelled; and it is so arranged that the electric motor control CPU 121 having received the voltage-level detection signal DETV produces a determination-voltage detection signal DET00 being a logic signal reacting in response to the presence or absence of a monitored voltage Vxx, and that the determination-voltage detection signal DET00 becomes an alternative signal of the main voltage detection signal DET0 in which the reception photocoupler 166a produces.

In the voltage-level detection circuits 160A and 160B, it is so arranged that a monitored voltage Vxx is applied through a plurality of current-limiting resistors 161 and a backflow blocking diode 162 to a constant-voltage circuit 163 including a zener or constant-voltage diode 163a, and that the constant-voltage circuit 163 generates a stable power-source voltage Vd by means of a voltage control transistor 163b, and the voltage is applied to a comparison circuit 169a.

Note that, a base power-supply resistor 163c is connected between a collector terminal and a base terminal of the voltage control transistor 163b being an NPN junction-type transistor, and the base terminal is connected to the downstream midpoint N2 by way of the constant-voltage diode 163a. To the plurality of current-limiting resistors 161 and the backflow blocking diode 162, an intermittent control transistor 169b, an electric charging reactor 164 and a smoothing capacitor 165 are also connected in series with one another, across which a monitored voltage Vxx is applied; and the smoothing capacitor 165 is connected in parallel with a series-connected circuit constituting of a light-emitting diode of the reception photocoupler 166a and of an electrical discharge resistor 168a, and is connected in parallel with negative feedback voltage-divider resistors 168b and 168c. And then, to an output transistor of the reception photocoupler 166a, a stabilized voltage Vcc is applied by way of a pull-up resistor 167a; an output of the output transistor is inputted, by way of the electric motor control CPU 121, into the electric charging control CPU 131 as the main voltage detection signal DET0. However, it may be adopted that the main voltage detection signal DET0 is directly inputted into the electric charging control CPU 131. Moreover, in a case of the voltage-level detection circuit 160B, the reception photocoupler 166a is not required, so that a short-circuit connection is made at the broken-line portion.

A voltage generated downstream of the negative feedback voltage-divider resistors 168b and 168c, and a voltage generated downstream of voltage-divider resistors 168d and 168e with respect to the stable power-source voltage Vd are applied to comparison input terminals of the comparison circuit 169a described above; and, by means of its comparison output, the intermittent control transistor 169b is intermittently controlled, and a negative feedback control is performed so that an electric charging voltage Vx of the smoothing capacitor 165 is in the relationship proportional to the stable power-source voltage Vd. However, because a positive feedback resistor 168f is connected between the output terminal of the comparison circuit 169a and its positive-side input terminal, it is so configured that the electric charging voltage Vx of the smoothing capacitor 165 changes in pulsation by reacting in response to the positive feedback voltage.

It is so arranged that a light-emitting diode of the intermittent reception photocoupler 166b is connected between an interconnection point of the intermittent control transistor 169b and the electric charging reactor 164, and a negative power-source line being the negative side of the constant-voltage circuit 163, and that the light-emitting diode of the intermittent reception photocoupler 166b is driven to emit light in a switch-off time-period of the intermittent control transistor 169b in such a manner that an induced current of the electric charging reactor 164 flows back by way of the smoothing capacitor 165.

And then, to an output transistor of the intermittent reception photocoupler 166b, the stabilized voltage Vcc is applied by way of a pull-up resistor 167b; an output of the output transistor is inputted into the electric motor control CPU 121 as the voltage-level detection signal DETV.

Therefore, the output transistor of the intermittent reception photocoupler 166b is only momentarily switched on in a discharge time-period of the electric charging reactor 164 due to a switch-off of the intermittent control transistor 169b, so that a logic level is set to "L,"; and, in a time-period for recharging the smoothing capacitor 165 when the intermittent control transistor 169b is switched on, the logic level is set to "H."

Because a required time-period for recharging the smoothing capacitor 165 which changes in pulsation according to the positive feedback resistor 168f is inversely proportional to a value of a monitored voltage Vxx, an intermittent frequency of the output transistor of the intermittent reception photocoupler 166b results in being approximately proportional to a value of the monitored voltage Vxx.

Note that, the intermittent control transistor 169b constantly performs switch-on driving by means of a timer circuit not shown in the figures, and a switch-off time-period is implemented so that an intermittent period where a switch-on time-period and the switch-off time-period are combined in total becomes constant; as a result, when a pulse width modulation (PWM) control is performed so that an electric charging voltage Vx of the smoothing capacitor 165 achieves a constant value, a conduction duty being a ratio of the switch-on time-period to an intermittent period results in being inversely proportional to a monitored voltage Vxx.

Therefore, the voltage-level detection signal DETV is a signal which can be either a pulse signal of a frequency which is proportional to a value of monitored voltage Vxx exactly as shown in FIG. 4, or a pulse width modulation (PWM) signal in which the conduction duty is inversely proportional to the value of monitored voltage Vxx by modifying a part of the circuit.

Next, in FIG. 5 that is a circuit diagram inclusively showing disconnection detection circuits in an electric charging control device 130AA illustratively shown as 130A in FIG. 1, a positive-side input terminal of the first voltage monitoring circuit 140a is connected to a upstream power-supply point P1 by way of a first upstream connection line P1a, and also a negative-side input terminal thereof is connected to a downstream power-supply point N1 by way of a first downstream connection line N1a. In addition, a positive-side input terminal of the second voltage monitoring circuit 140b is connected to the upstream power-supply point P1 by way of a second upstream connection line P1b, and also a negative-side input terminal thereof is connected to the downstream power-supply point N1 by way of a second downstream connection line N1b. And then, one end of the first upstream connection line P1a and one end of the second upstream connection line P1b are inputted into a first comparator circuit 183a by way of positive-side connection capacitors 181a and 182a, respectively; and also one end of the first downstream connection line N1a and one end of the second downstream connection line N1b are inputted into a second comparator circuit 183b by way of negative-side connection capacitors 181b and 182b, respectively. Moreover, to a positive-side input terminal of the first comparator circuit 183a and that of the second comparator circuit 183b, a first high-frequency signal voltage Va and a second high-frequency signal voltage Vb are applied by means of a first oscillator circuit 180a and a second oscillator circuit 180b, respectively.

With respect to a short-circuit state in which, under the normal operating conditions, the positive-side input terminal of the first comparator circuit 183a and the negative-side input terminal thereof are short-circuited to each other by way of the positive-side connection capacitor 181a, the first upstream connection line P1a, the second upstream connection line P1b and the positive-side connection capacitor 182a, a first disconnection detection signal DISa is produced when the short-circuit state between the positive-side input terminal and the negative-side input terminal is disengaged because the first upstream connection line P1a or the second upstream connection line P1b is disconnected.

It is so arranged that, with respect to a short-circuit state in which, under the normal operating conditions, the positive-side input terminal of the second comparator circuit 183b and the negative-side input terminal thereof are short-circuited to each other by way of the negative-side connection capacitor 181b, the first downstream connection line N1a, the second downstream connection line N1b and the negative-side connection capacitor 182b, asecond disconnection detection signal DISb is produced when the short-circuit state between the positive-side input terminal and the negative-side input terminal is disengaged because the first downstream connection line N1a or the second downstream connection line N1b is disconnected.

Hereinafter, as to the electric charging control device 130A configured as shown from FIG. 1 to FIG. 5 according to Embodiment 1 of the present invention, the explanation will be made in more detail for the working-effects and operations.

First, in FIG. 1 illustrating the overall circuit block diagram, the upper-level control CPU 510 is started up by means of the stabilized power source 540 of the upper-level control device 500, when the power switch 600 is turned on; from this time onward, control operations are continued until save processing of memory-stored information is performed because self-holding power supply is performed in a temporary manner even when the power switch 600 is turned off. At the same time, electric power is also supplied to the stabilized power source 124 of the electric motor control device 120 and the stabilized power source 134 of the electric charging control device 130A, so that the electric motor control CPU 121 and the electric charging control CPU 131 start control operations.

Note that, these stabilized power sources 540, 124 and 134 are each arranged so that electric power is supplied from the auxiliary battery 400 of, for example, a DC 12-volt system which is electrically insulated from the main battery 300, and that the auxiliary battery 400 is charged through from the main battery 300 to achieve a predetermined auxiliary power-source voltage Vbb by means of the upstream main contactor 130u and the downstream main contactor 130d, and the insulated-type buck charging device 410.

It is so arranged that, across the inverter 110, a main power-source voltage Vaa at, for example, DC 400 V is applied through from the main battery 300 by way of the upstream main contactor 130u and the downstream main contactor 130d, and that electric power is supplied to the vehicle driving motors 200 by means of a three-phase full-wave bridge circuit constituted of the upstream switch-on/switch-off devices 110u of three pairs and the downstream switch-on/switch-off devices 110d thereof.

And then, it is so arranged that the electric motor control device 120 controls the inverter 110 so as to perform power running by applying three-phase pseudo-sinusoidal voltages of a variable frequency with respect to the vehicle driving motors 200, and also that the electric motor control device performs regenerative electric charging control with respect to the main battery 300 by utilizing the vehicle driving motors 200 as electric power generators at the times of coasting of an automotive vehicle and descending hill-slope running thereof.

Other than an electric current detection sensor for use in an electric current control not shown in the figures, the voltage-level detection circuit 160A is mounted in the inverter 110 for producing the voltage-level detection signal DETV and the main voltage detection signal DET0 which are inputted into the electric motor control CPU 121; it is so arranged that the electric motor control CPU 121 detects a regenerative electric charging voltage by reacting in response to the voltage-level detection signal DETV, and controls the regenerative electric charging voltage which does not become excessively large.

Note that, when a drive control of the vehicle driving motors 200 and their electric power generation control are performed, the main electric contactors 130u and 130d are close-circuited, and the upstream switch-on/switch-off devices 110u and the downstream switch-on/switch-off devices 110d are driven to turn-on/turn-off; however, the upstream and downstream electric-charging contactors 190u and 190d are open-circuited. Meanwhile, when electric charging is performed upon the main battery 300 using the power-source apparatus 900, it is so arranged that the upstream and downstream main contactors 130u and 130d, and the electric charging contactors 190u and 190d are all driven to close-circuit, and that the upstream switch-on/switch-off devices 110u and the downstream switch-on/switch-off devices 110d are de-energized and turned off; however, before an actual electric charging operation is started, an abnormality inspection is performed which is mainly constituted of an inspection of the presence or absence of welding abnormality on the main electric contactors 130u and 130d, and on the electric charging contactors 190u and 190d, so that countermeasures are taken not to expose a high-voltage energized member, when a plug cover 904 for use in electric charging (refer to FIG. 10) is released to be open.

Figure 6:
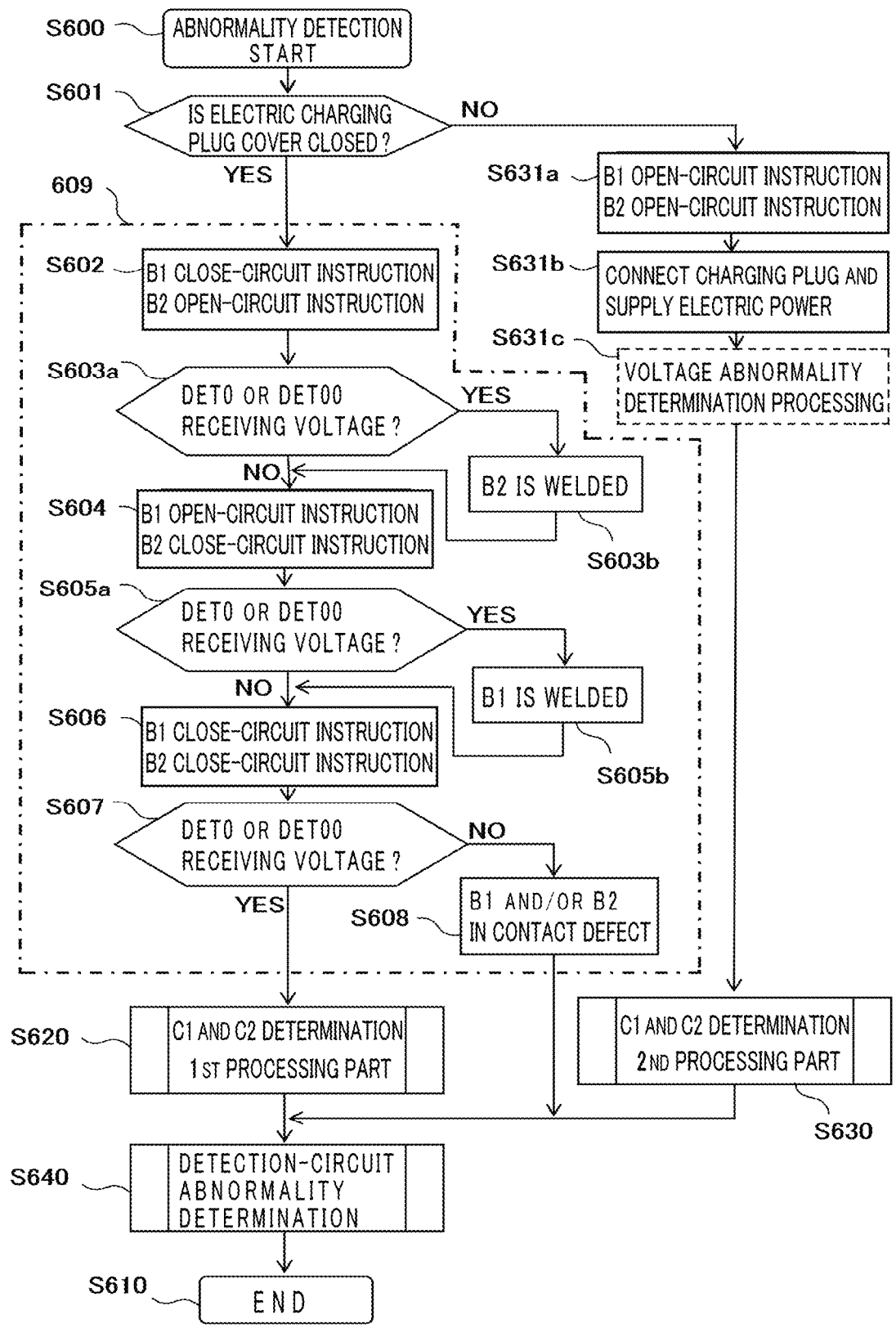
FIG. 6 is an overall flowchart for explaining abnormality inspection operations in the electric charging control device according to Embodiment 1 of the present invention.

FIG. 6 is an overall flowchart for explaining abnormality inspection operations in Embodiment 1 shown in FIG. 1; the explanation will be made referring to FIG. 1 and FIG. 2 in more detail for the working-effects and operations.

In FIG. 6, Step S600 is Operation-Start Step of the abnormality inspection operations.

The following Step S601 is a determination process step in which determination is made whether or not the plug cover 904 (refer to FIG. 10) mounted on an automotive vehicle's bodywork side for connecting the electric charging plug 901 is closed under lock; determination of "YES" is made if the plug cover is closed under lock, so that the processing moves to Step S602; and else determination of "NO" is made when it is released to be open, so that the processing moves to Step S631a.

Step S602 is a process step which a close-circuit instruction is given to the main upper contact B1 in FIG. 2, and an open-circuit instruction is given to the main lower contact B2 therein; and the processing moves to Step S603.

Step S603a is a determination process step in which, if the main voltage detection signal DET0 indicates superiority and if a monitored voltage between the upstream midpoint P2 and the downstream midpoint N2 is a predetermined value or more, determination of "YES" is made because of the presence of the received voltage, so that the processing moves to Step S603b; and else determination of "NO" is made because of the absence indicating inferiority without receiving voltage, so that the processing moves to Step S604.

At Step S603b, although the main lower contact B2 is to be open-circuited at Step S602, the main voltage detection signal DET0 detects the presence of voltage at Step S603a, whereby determination is made on the main lower contact B2 that is welded, which is stored in memory; and the processing moves to Step S604.

Step S604 is a process step in which an open-circuit instruction is given to the main upper contact B1 in FIG. 2, and a close-circuit instruction is given to the main lower contact B2 therein; and the processing moves to Step S605a.

Step S605a is a determination process step in which, when the main voltage detection signal DET0 indicates superiority and a monitored voltage between the upstream midpoint P2 and the downstream midpoint N2 is a predetermined value or more, determination of "YES" is made because of the presence of the received voltage, so that the processing moves to Step S605b; and else determination of "NO" is made because of the absence indicating inferiority without receiving voltage, so that the processing moves to Step S606.

At Step S605b, although the main upper contact B1 is to be open-circuited at Step S604, the main voltage detection signal DET0 detects the presence of voltage at Step S605a, whereby determination is made on the main upper contact B1 that is welded, which is stored in memory; and the processing moves to Step S606.

Step S606 is a process step in which close-circuit instructions are given together to the main upper contact B1 in FIG. 2 and the main lower contact B2 therein, and the processing moves to Step S607.

Step S607 is a determination process step in which, when the main voltage detection signal DET0 indicates superiority and when a monitored voltage between the upstream midpoint P2 and the downstream midpoint N2 is a predetermined value or more, determination of "YES" is made because of the presence of the received voltage, so that the processing moves to a processing block S620; and else determination of "NO" is made because of the absence indicating inferiority without receiving voltage, so that the processing moves to Step S608. The processing block S620 is a processing block which becomes a first electric charging contactor abnormality detection means, and so its explanation will be made in more detail referring to FIG. 7.

At Step S608, although the main upper contact B1 and the main lower contact B2 are together to be close-circuited at Step S606, the main voltage detection signal DET0 indicates inferiority and detects the absence of voltage at Step S607, whereby determination is made on at least one of the main upper contact B1 and the main lower contact B2 that is in a contact defect, which is stored in memory; and the processing moves to a processing block S640.

A processing block S609 from Step S602 reaching through to Step S608 described above is a processing block which becomes a main contactor abnormality detection means 609; at Steps S603a, S605a and S607 each, the determination-voltage detection signal DET00 described above by referring to FIG. 4 can be used for the determination related to the presence or absence of an intermediate point voltage in place of the main voltage detection signal DET0.

Step S631a is executed when the plug cover 904 is released to be open as a determination result by means of the processing block S609 because determination has been made that there does not exist abnormality in the main upper contact B1 and the main lower contact B2, and when the determination of "NO" has been made at Step S601; at this Step S631a, open-circuit instructions are given together to the main upper contact B1 in FIG. 2 and the main lower contact B2 therein, and afterward, the processing moves to Step S631b.

Step S631b is a process step in which the electric charging plug 901 is connected to the electric charging plug entrance 190, and the electric charging power-source apparatus 900 generates an output voltage by means of an instruction from the upper-level control device 500.

The following Step S631c is a process step which is validated when the voltage-level detection circuit 160A shown in FIG. 4 is utilized here in place of at least one of the first voltage monitoring circuit 140a in FIG. 1 and the second voltage monitoring circuit 140b therein; it is so arranged that, by monitoring the voltage-level detection signal DETV that is produced by the voltage-level detection circuit 160A by reacting in response to the output voltage of the electric charging power-source apparatus 900 generated at Step S631b, determination processing is performed which corresponds to whether or not the generated voltage of the electric charging power-source apparatus 900 is within a voltage of an appropriate voltage range, and that the processing moves to a processing block S630.

Note that, the processing block S630 is a processing block which becomes a second electric charging contactor abnormality detection means, and so its explanation will be made in more detail referring to FIG. 8.

The processing block S640 executed subsequent to the processing block S620, S630 or the Step S608 is a processing block which becomes as a detection-circuit abnormality determination means. In the detection-circuit abnormality determination means 640, it is so arranged that: in a first power-supply state in which the electric charging plug 901 is not inserted and the pair of main electric contactors 130u and 130d is close-circuited, or in a second power-supply state in which the pair of main electric contactors 130u and 130d is open-circuited and electric power is supplied from the electric charging power-source apparatus 900 after the electric charging plug 901 is inserted, determination results are compared at three points with one another by means of the main voltage detection signal DET0, and the first voltage detection signal DET1 and the second voltage detection signal DET2, each related to the presence or absence of a respective point's detection voltage in accordance with the pair of electric charging contactors 190u and 190d which is together open-circuited and then close-circuited; and also determination is made so that abnormality of the voltage-level detection circuit 160A is caused, when the first voltage detection signal DET1 and the second voltage detection signal DET2 both indicate the presences of voltage detection and when the main voltage detection signal DET0 indicates the absence of voltage detection, or when the first voltage detection signal DET1 and the second voltage detection signal DET2 both indicate the absences of voltage detection and when the main voltage detection signal DET0 indicates the presence of voltage detection.

At Operation-End Step S610 following the processing block S640, it is so arranged that another control program is executed, and that the processing returns for a second time to Operation-Start Step S600 within a predetermined limiting time, when an abnormality detection time-duration is continued.

Figure 7:
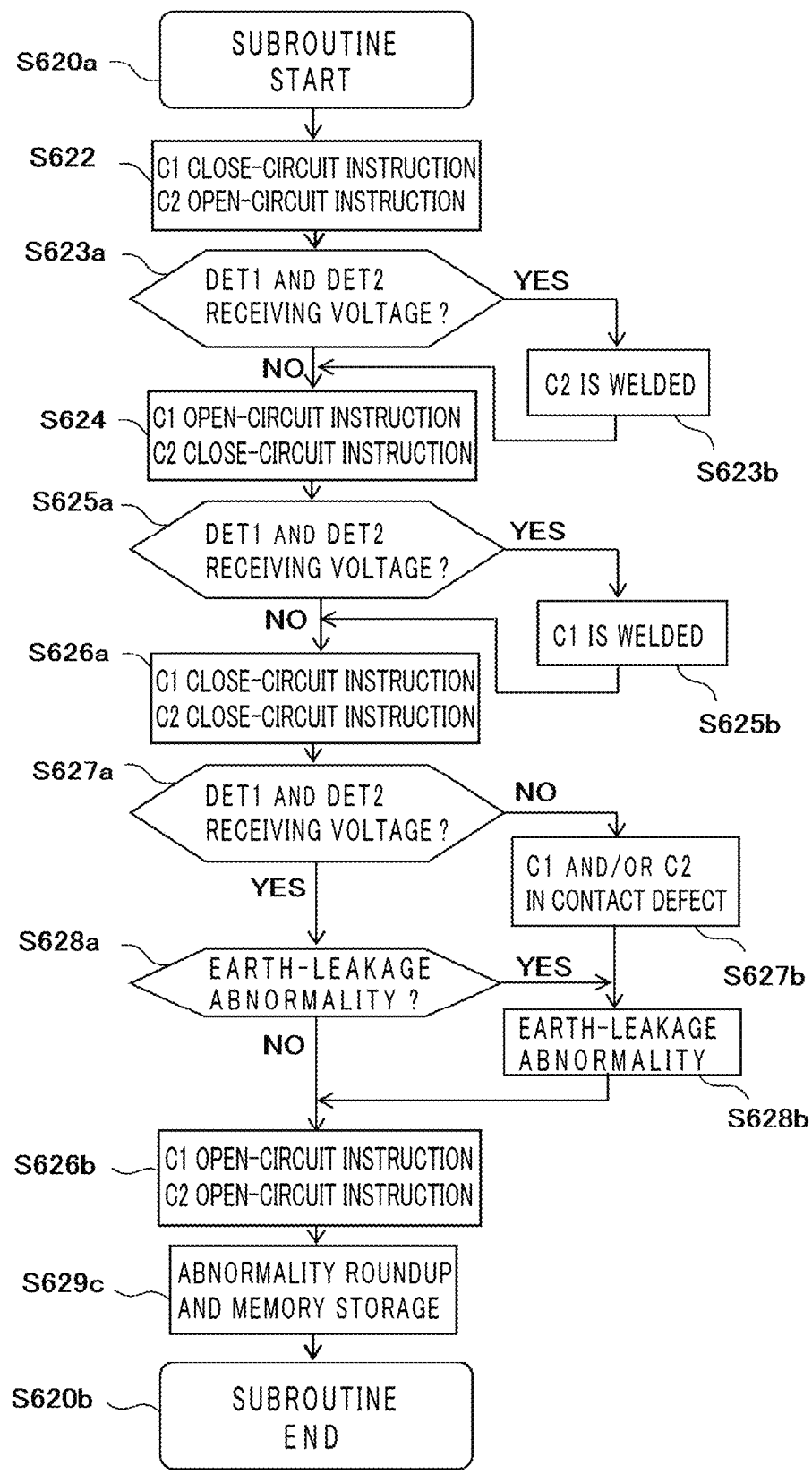
FIG. 7 is a detailed flowchart of a first processing part within the overall flowchart shown in FIG. 6.

FIG. 7 is a diagram showing a flowchart for explaining the operations of the processing block S620 within the overall flowchart of FIG. 6.

In FIG. 7, Step S620a is Operation-Start Step of the subroutine program.

The following Step S622 is a process step in which a close-circuit instruction is given to the electric charging upper contact C1 in FIG. 2, and an open-circuit instruction is given to the electric charging lower contact C2 therein; and the processing moves to Step S623a.

Step S623a is a determination process step in which, when the first voltage detection signal DET1 and the second voltage detection signal DET2 indicate superiority and when a monitored voltage between the upstream power-supply point P1 and the downstream power-supply point N1 is a predetermined value or more, determination of "YES" is made because of the presence of the received voltage, so that the processing moves to Step S623b; and else determination of "NO" is made because of the absence indicating inferiority without receiving voltage, so that the processing moves to Step S624.

At Step S623b, although the electric charging lower contact C2 is to be open-circuited at Step S622, the first voltage detection signal DET1 and the second voltage detection signal DET2 detect the presence of voltage at Step S623a, whereby determination is made on the electric charging lower contact C2 that is welded, which is stored in memory; and the processing moves to Step S624.

Step S624 is a process step in which an open-circuit instruction is given to the electric charging upper contact C1 in FIG. 2, and a close-circuit instruction is given to the electric charging lower contact C2 therein; and the processing moves to Step S625a.

Step S625a is a determination process step in which, when the first voltage detection signal DET1 and the second voltage detection signal DET2 indicate superiority and when a monitored voltage between the upstream power-supply point P1 and the downstream power-supply point N1 is a predetermined value or more, determination of "YES" is made because of the presence of the received voltage, so that the processing moves to Step S625b; and else determination of "NO" is made because of the absence indicating inferiority without receiving voltage, so that the processing moves to Step S626a.

At Step S625b, although the electric charging upper contact C1 is to be open-circuited at Step S624, the first voltage detection signal DET1 and the second voltage detection signal DET2 indicate superiority and detect the presence of voltage at Step S625a, whereby determination is made on the electric charging upper contact C1 that is welded, which is stored in memory; and the processing moves to Step S626a.

Step S626a is a process step in which close-circuit instructions are given together to the electric charging upper contact C1 in FIG. 2 and the electric charging lower contact C2 therein; and the processing moves to Step S627a.

Step S627a is a determination process step in which, when the first voltage detection signal DET1 and the second voltage detection signal DET2 indicate superiority and when a monitored voltage between the upstream power-supply point P1 and the downstream power-supply point N1 is a predetermined value or more, determination of "YES" is made because of the presence of the received voltage, so that the processing moves to Step S628a; and else determination of "NO" is made because of the absence indicating inferiority without receiving voltage, so that the processing moves to Step S627b.

At Step S627b, although the electric charging upper contact C1 and the electric charging lower contact C2 are together to be close-circuited at Step S626a, the first voltage detection signal DET1 and the second voltage detection signal DET2 indicate inferiority and detect the absence of voltage at Step S627a, whereby determination is made on at least one of the electric charging upper contact C1 and the electric charging lower contact C2 that is in a contact defect, which is stored in memory; and the processing moves to Step S628b.

Step S628a is a determination process step in which the earth-leakage detection circuit 133 mounted in the electric charging control device 130A measures earth-leakage resistance between a high-voltage circuit system principally constituted of the main battery 300 and the inverter 110, and the automotive vehicle's bodywork; determination of "YES" is made when the insulation resistance does not possess a predetermined value or more, so that the processing moves to Step S628b; and else determination of "NO" is made when sufficient insulation resistance is possessed, so that the processing moves to Step S626b.

At Step S628b, an occurrence of earth-leakage abnormality state is stored in memory, and the processing moves to Step S626b.

At Step S626b, the electric charging upper contact C1 and the electric charging lower contact C2 both being driven to be close-circuited at Step S626a are de-energized so as to be open-circuited, and afterward, the processing moves to Step S629c.

At Step S629c, the presence or absence of an abnormality occurrence in the upstream and downstream electric-charging contactors 190u and 190d and its category, and the presence or absence of earth-leakage abnormality are stored in memory, the processing moves to Operation-End Step S620b of the subroutine program; subsequently, it is so arranged that the processing moves to the processing block S640 of FIG. 6.

Figure 8:
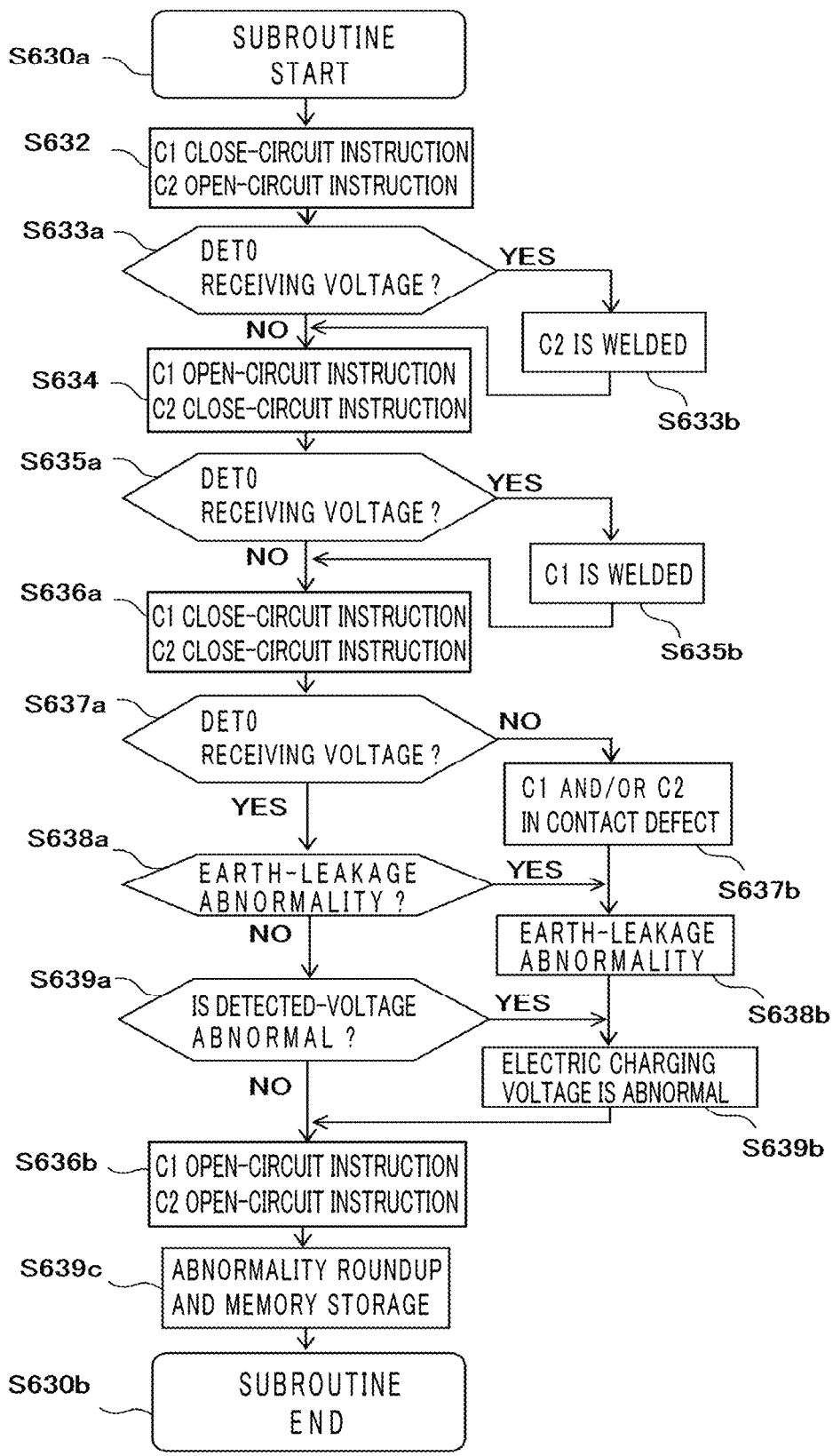
FIG. 8 is a detailed flowchart of a second processing part within the overall flowchart shown in FIG. 6.

FIG. 8 is a diagram showing a flowchart for explaining the operations of the processing block S630 within the overall flowchart of FIG. 6.

In FIG. 8, Step S630a is Operation-Start Step of the subroutine program.

The following Step S632 is process step in which a close-circuit instruction is given to the electric charging upper contact C1 in FIG. 2, and an open-circuit instruction is given to the electric charging lower contact C2 therein; and the processing moves to Step S633a.

Step S633a is a determination process step in which, when the main voltage detection signal DET0 indicates superiority and when a monitored voltage between the upstream midpoint P2 and the downstream midpoint N2 is a predetermined value or more, determination of "YES" is made because of the presence of the received voltage, so that the processing moves to Step S633b; and else determination of "NO" is made because of the absence indicating inferiority without receiving voltage, so that the processing moves to Step S634.

At Step S633b, although the electric charging lower contact C2 is to be open-circuited at Step S632, the main voltage detection signal DET0 detects the presence of voltage at Step S633a, whereby determination is made on the electric charging lower contact C2 that is welded, which is stored in memory; and the processing moves to Step S634.

Step S634 is a process step in which an open-circuit instruction is given to the electric charging upper contact C1 in FIG. 2, and a close-circuit instruction is given to the electric charging lower contact C2 therein; and the processing moves to Step S635a.

Step S635a is a determination process step in which, when the main voltage detection signal DET0 indicates superiority and when a monitored voltage between the upstream midpoint P2 and the downstream midpoint N2 is a predetermined value or more, determination of "YES" is made because of the presence of the received voltage, so that the processing moves to Step S635b; and else determination of "NO" is made because of the absence indicating inferiority without receiving voltage, so that the processing moves to Step S636a.

At Step S635b, although the electric charging upper contact C1 is to be open-circuited at Step S634, the main voltage detection signal DET0 indicates superiority and detects the presence of voltage at Step S635a, whereby determination is made on the electric charging upper contact C1 that is welded, which is stored in memory; and the processing moves to Step S636a.

Step S636a is a process step in which close-circuit instructions are given together to the electric charging upper contact C1 in FIG. 2 and the electric charging lower contact C2 therein, and the processing moves to Step S637a.

Step S637a is a determination process step in which, when the main voltage detection signal DET0 indicates superiority and when a monitored voltage between the upstream power-supply point P1 and the downstream power-supply point N1 is a predetermined value or more, determination of "YES" is made because of the presence of the received voltage, so that the processing moves to Step S638a; and else determination of "NO" is made because of the absence indicating inferiority without receiving voltage, so that the processing moves to Step S637b.

At Step S637b, although the electric charging upper contact C1 and the electric charging lower contact C2 are together to be close-circuited at Step S636a, the main voltage detection signal DET0 indicates inferiority and detects the absence of voltage at Step S637a, whereby determination is made on at least one of the electric charging upper contact C1 and the electric charging lower contact C2 that is in a contact defect, which is stored in memory; and the processing moves to Step S638b.

Step S638a is a determination process step in which the earth-leakage detection circuit 133 mounted in the electric charging control device 130A measures earth-leakage resistance between a high-voltage circuit system principally constituted of the inverter 110 and the automotive vehicle's bodywork; determination of "YES" is made when the insulation resistance does not possess a predetermined value or more, so that the processing moves to Step S638b; and else determination of "NO" is made when sufficient insulation resistance is possessed, so that the processing moves to Step S639a.

At Step S638b, an occurrence of earth-leakage abnormality is stored in memory, and the processing moves to Step S639b as will be described later.

Step S639a is a determination process step in which a generated voltage of the electric charging power-source apparatus 900 is measured using the voltage-level detection circuit 160A mounted in the inverter 110 in an open-circuited state of the main electric contactors 130u and 130d, and determination is performed whether or not the generated voltage is a voltage in an appropriate range; determination of "YES" is made when there exists abnormality, so that the processing moves to Step S639b; and else determination of "NO" is made when there does not exist abnormality, so that the processing moves to Step S636b.

It should be noted that, Step S639a is a process step which becomes a detected-voltage abnormality determination means which is made as a process step to achieve an alternative function with respect to Step S631c of FIG. 6, when the first voltage monitoring circuit or the second voltage monitoring circuit is a circuit which does not have a main voltage detection function.

At Step S639b, an occurrence of electric charging voltage abnormality is stored in memory, and the processing moves to Step S636b.

At Step S636b, the electric charging upper contact C1 and the electric charging lower contact C2 both being driven to be close-circuited at Step S636a are together de-energized so as to be open-circuited, and afterward, the processing moves to Step S639c.

At Step S639c, the presence or absence of an abnormality occurrence in the upstream and downstream electric-charging contactors 190u and 190d and its category, and the presence or absence of earth-leakage abnormality are stored in memory, and the processing moves to Operation-End Step S630b of the subroutine program; subsequently, it is so arranged that the processing moves to the processing block S640 of FIG. 6.

As is clear in the explanation above, the electric charging control device 130A according to Embodiment 1 of the present invention comprises the electric charging control CPU 131 whose electric power is supplied from the auxiliary battery 400 which has a lower voltage than that of the main battery 300 and is electrically insulated between these low and high voltages to each other, for serially connecting with respect to the upper-level control device 500 which performs centralized control of the automotive electrical power conversion apparatus 100A, and for constituting a portion of the automotive electrical power conversion apparatus 100A including the inverter 110 for supplying electric power of three-phase alternating-current voltages to the vehicle driving motors 200 through from the main battery 300 mounted aboard an automotive vehicle, the pair of main electric contactors 130u and 130d connected between the main battery 300 and the inverter 110 at their upstream position and their downstream position, and the electric motor control device 120 operating with respect to the inverter 110, and also additively including the pair of electric charging contactors 190u and 190d whose one ends each are connected with respect to the upstream power-supply point P1 and the downstream power-supply point N1 which are connected to the electric charging plug 901 provided for the electric charging power-source apparatus 900 being a ground-based device, and whose other ends being the upstream midpoint P2 and the downstream midpoint N2 are connected in series with the pair of main electric contactors 130u and 130d. The electric charging control device 130A for performing open-circuit/close-circuit control on at least one of the pair of main electric contactors 130u and 130d and the pair of electric charging contactors 190u and 190d is characterized in that the upper-level control device 500 further comprises the upper-level control CPU 510 for performing mutual monitoring by means of a serial communications circuit between the electric charging power-source apparatus 900, the electric motor control CPU 121 mounted on the electric motor control device 120, the electric charging instruction device 132 for driving to close-circuit the pair of electric charging contactors 190u and 190d, and the electric charging control CPU 131 for driving the pair of main electric contactors 130u and 130d, and for performing communications of a control signal therebetween.

And then, the electric charging control CPU 131 is connected to the first voltage monitoring circuit 140a connected between the upstream power-supply point P1 and the downstream power-supply point N1, for producing the first voltage detection signal DET1 insulated between a high voltage thereon and a low voltage thereon, and to the second voltage monitoring circuit 140b connected therebetween, for producing the second voltage detection signal DET2 insulated between a high voltage thereon and a low voltage thereon; the first voltage monitoring circuit 140a and the second voltage monitoring circuit 140b are made as a voltage monitoring circuitry of a double system for producing the first voltage detection signal DET1 and the second voltage detection signal DET2, respectively, each of which is a determination logic signal responding to the presence or absence of a monitored voltage; the inverter 110 further comprises the voltage-level detection circuit 160A for determining whether or not a main power-source voltage Vaa of a high voltage is applied from the main battery 300, and for producing a main voltage detection signal DET0 being a determination logic signal insulated between a high voltage thereon and a low voltage thereon, and/or a determination-voltage detection signal DET00 by way of the electric motor control CPU 121 by producing the voltage-level detection signal DETV thereto; and the upper-level control CPU 510 comprises a control program constituting of the main contactor abnormality detection means 609 executed in cooperation with the electric charging control CPU 131, a first electric charging contactor abnormality detection means executed in a state in which the pair of main electric contactors 130u and 130d is close-circuited under a condition that the electric charging plug 901 is not connected, and the second electric charging contactor abnormality detection means executed in a state in which the pair of main electric contactors 130u and 130d is open-circuited under a condition that the electric charging plug 901 is connected and electric power is supplied from the electric charging power-source apparatus 900.

And also, the main contactor abnormality detection means 609 is a means for distinguishably determining the presence or absence of welding abnormality of those main electric contactors or a contact defect thereof on a one-by-one basis, in a non-connection state of the electric charging plug 901, corresponding to a combination state of a drive instruction with respect to the pair of main electric contactors 130u and 130*d*, and corresponding to a detection logic of the main voltage detection signal DET0 or the determination-voltage detection signal DET00; the first electric charging contactor abnormality detection means is a means for distinguishably determining the presence or absence of welding abnormality of those electric charging contactors or a contact defect thereof on a one-by-one basis corresponding to a combination state of a drive instruction with respect to the pair of electric charging contactors 190*u* and 190*d*, and corresponding to a detection logic of the first voltage detection signal DET1 and that of the second voltage detection signal DET2; the second electric charging contactor abnormality detection means either subsumes the detected-voltage abnormality determination means 639*a* for determining whether or not a generated voltage of the electric charging power-source apparatus 900 detected by the voltage-level detection circuit 160A is within a predetermined threshold-value range being set in advance, or comprises a means for distinguishably determining the presence or absence of welding abnormality of those electric charging contactors or a contact defect thereof on a one-by-one basis corresponding to at least a combination state of a drive instruction with respect to the pair of electric charging contactors 190*u* and 190*d*, and a detection logic of the main voltage detection signal DET0; and it is so arranged that the plug cover 904 is mounted on the electric charging plug entrance 190 of the electric charging plug 901, and that, when the plug cover 904 is open and the electric charging plug 901 is not inserted, at least one pair of the main electric contactors 130*u* and 130*d* and the electric charging contactors 190*u* and 190*d* is configured not to be driven for close-circuiting, and is also configured to prohibit a close-circuit instruction with respect to at least the other pair, when there exists welding abnormality in any one contactor of the pair of electric charging contactors 190*u* and 190*d*, and the pair of main electric contactors 130*u* and 130*d*.

The voltage monitoring circuitry redundantly includes the first voltage monitoring circuit 140*a* connected between the upstream power-supply point P1 and the downstream power-supply point N1, for producing the first voltage detection signal DET1, and the second voltage monitoring circuit 140*b* connected therebetween, for producing the second voltage detection signal DET2; and the upper-level control CPU 510 further includes a control program being the detection-circuit abnormality determination means 640 executed in cooperation with the electric charging control CPU 131, wherein the detection-circuit abnormality determination means 640 compares, in a first power-supply state in which the electric charging plug 901 is not inserted and the pair of main electric contactors 130*u* and 130*d* is close-circuited, or in a second power-supply state in which the pair of main electric contactors 130*u* and 130*d* is open-circuited and electric power is supplied from the electric charging power-source apparatus 900 after the electric charging plug 901 is inserted, determination results at three points with one another by means of the main voltage detection signal DET0, and the first voltage detection signal DET1 and the second voltage detection signal DET2, each related to the presence or absence of a respective point's detection voltage in accordance with the pair of electric charging contactors 190*u* and 190*d* which is together open-circuited and then close-circuited; the detection-circuit abnormality determination means determines that the voltage-level detection circuit 160A is abnormal, when the first voltage detection signal DET1 and the second voltage detection signal DET2 both indicate the presences of voltage detection and when the main voltage detection signal DET0 indicates the absence of voltage detection, or when the first voltage detection signal DET1 and the second voltage detection signal DET2 both indicate the absences of voltage detection and when the main voltage detection signal DET0 indicates the presence of voltage detection; and a close-locking mechanism operates to prohibit releasing the plug cover 904 to be open, or at least an open-caution notification means is provided, when welding abnormality of the main electric contactor(s) 130*u* and/or 130*d* is detected by the main contactor abnormality detection means 609.

As described above, the detection-circuit abnormality determination means is included in which, in the first power-supply state by means of a main battery in which the electric charging plug is not inserted, or in the second power-supply state by means of an electric charging power-source apparatus in which the electric charging plug is inserted, the presence or absence of abnormality of the voltage-level detection circuit itself is determined by a majority logic using the main voltage detection signal, and the first and second voltage detection signals.

Therefore, by reacting in response to the presence or absence of abnormality of the voltage-level detection circuit itself, there exists a feature to enable producing at least an abnormality notification signal. In addition, when respective determination of the presence or absence on the detection voltages by means of the first and second voltage detection signals is not in coincidence with each other, there exists a feature that determination can be made easily in which the first or second voltage monitoring circuit itself is abnormal.

A positive-side input terminal of the first voltage monitoring circuit 140*a* is connected to the upstream power-supply point P1 by way of a first upstream connection line P1*a*, and also a negative-side input terminal thereof is connected to the downstream power-supply point N1 by way of a first downstream connection line N1*a*; a positive-side input terminal of the second voltage monitoring circuit 140*b* is connected to the upstream power-supply point P1 by way of a second upstream connection line P1*b*, and also a negative-side input terminal thereof is connected to the downstream power-supply point N1 by way of a second downstream connection line N1*b*; one end of the first upstream connection line P1*a* and one end of the second upstream connection line P1*b* are inputted into the first comparator circuit 183*a* by way of the positive-side connection capacitors 181*a* and 182*a*, respectively; one end of the first downstream connection line N1*a* and one end of the second downstream connection line N1*b* are inputted into the second comparator circuit 183*b* by way of the negative-side connection capacitors 181*b* and 182*b*, respectively; and, to a positive-side input terminal of the first comparator circuit 183*a* and that of the second comparator circuit 183*b*, a first high-frequency signal voltage Va and a second high-frequency signal voltage Vb are applied by means of the first oscillator circuit 180*a* and the second oscillator circuit 180*b*, respectively.

And then, it is so arranged that, with respect to a short-circuit state in which, under the normal operating conditions, the positive-side input terminal of the first comparator circuit 183*a* and the negative-side input terminal thereof are short-circuited to each other by way of the positive-side connection capacitor 181*a*, the first upstream connection line P1*a*, the second upstream connection line P1*b* and the positive-side connection capacitor 182*a*, a first disconnection detection signal DISa is produced when the short-circuit state between the positive-side input terminal and the negative-side input terminal is disengaged because the first upstream connection line P1*a* or the second upstream connection line P1b is disconnected; and, with respect to a short-circuit state in which, under the normal operating conditions, the positive-side input terminal of the second comparator circuit 183b and the negative-side input terminal thereof are short-circuited to each other by way of the negative-side connection capacitor 181b, the first downstream connection line N1a, the second downstream connection line N1b and the negative-side connection capacitor 182b, a second disconnection detection signal DISb is produced when the short-circuit state between the positive-side input terminal and the negative-side input terminal is disengaged because the first downstream connection line N1a or the second downstream connection line N1b is disconnected.

As described above, byway of the positive-side connection capacitors and the negative-side connection capacitors which are connected through radio or high frequencies by means of the first and second oscillator circuits, it is so arranged that the presence or absence of disconnection abnormality is determined, using the first and second comparator circuits, on the first and second upstream connection lines and on the first and second downstream connection lines with respect to the positive-side and negative-side input terminals of the first and second voltage monitoring circuits, respectively.

Therefore, by separating a high-voltage circuit system from a low-voltage circuit system by means of the positive-side and negative-side connection capacitors, disconnection abnormality of high-voltage system's wiring can be easily detected and outputted into the low-voltage circuit system, so that there also exists a feature that the reliability of determination of the first and second voltage monitoring circuits can be enhanced.

The voltage-level detection circuit 160A is utilized in place of at least one of the first voltage monitoring circuit 140a and the second voltage monitoring circuit 140b; a generated voltage of the electric charging power-source apparatus 900 is detected by the voltage-level detection circuit 160A, when the electric charging plug 901 is inserted; and a voltage abnormality determination processing means 631c is included in which, in cooperation between the upper-level control CPU 510 and the electric charging control CPU 131, determination is made whether or not a generated voltage of the electric charging power-source apparatus 900 is within a range of a predetermined setting threshold-value voltage being set in advance, and a close-circuit drive of the pair of electric charging contactors 190u and 190d is prohibited, when the generated voltage of the electric charging power-source apparatus 900 is abnormal.

As described above, a voltage-level detection circuit is utilized for at least one of the first and second voltage monitoring circuits; accordingly, it is so arranged that the presence or absence of abnormality on a generated voltage of the electric charging power-source apparatus is determined, so that, at the time of abnormality, a close-circuit drive of the pair of electric charging contactors is prohibited.

Therefore, there exists a feature to enable preventing expansion of an abnormality occurrence due to abnormality of the electric charging power-source apparatus, or a setting malfunction of a target setting voltage or the like with respect to the electric charging power-source apparatus.

The first and second voltage monitoring circuits 140a and 140b each include the plurality of series connected current-limiting resistors 141 and the constant-voltage diode 143 which are connected between a positive power-source line subjected to monitoring and a negative power-source line subjected thereto, and it is so arranged that a light-emitting diode of the reception photocoupler 146 is connected through the series resistor 144 and in parallel with respect to the constant-voltage diode 143, and the smoothing capacitor 145 is connected in parallel to the light-emitting diode or to the constant-voltage diode 143, and that the first voltage detection signal DET1 or the second voltage detection signal DET2 is produced by a transistor output of the reception photocoupler 146.

As described above, it is so arranged that, using the reception photocoupler that operates by a lowered voltage obtained from a monitored voltage by means of the current-limiting resistors and the constant-voltage diode, the first and second voltage monitoring circuits obtain the first and second voltage detection signals, respectively, each of which is insulated between a high voltage side on the circuit and a low voltage side thereon.

Therefore, when a main power-source voltage Vaa=400 V, and when a monitored voltage Vxx is reduced due to incomplete welding in any one of the contactors, it is suitable to determine, in order to detect a case in which the monitored voltage is reduced down to, for example, DC 40 V, a value (s) of the current-limiting resistors so that an operating electric current of the reception photocoupler (for example, Id=10 mA) is obtained at that time.

However, in order to detect such a low voltage state, the current-limiting resistors take a small value, so that there arises a problem which resides, in a normal state of each of the contactors, as power consumption becomes large when the DC 400 V is applied; in order to detect a contacting state(s) of the contacts, it is suitable to try to flow a large test current to the extent possible for precise abnormality detection.

Note that, this type of voltage monitoring circuitry being a basic type is a circuit which can also be applicable to any one of Embodiment 1 and Embodiment 2.

The voltage-level detection circuit 160A is a circuit for producing any one of the main voltage detection signal DET0, the first voltage detection signal DET1 and the second voltage detection signal DET2, and the voltage-level detection signal DETV; and the voltage-level detection signal DETV is insulated between a high voltage thereon and a low voltage thereon, and is made as an analog signal voltage which is proportional to a detected voltage, or as a pulse signal voltage whose pulse duty or pulse period changes in response to a detected voltage.

As described above, it is so arranged that the voltage-level detection circuit produces the voltage-level detection signal DETV which is either an analog signal voltage or a pulse signal voltage, which is inputted into the electric motor control CPU or the electric charging control CPU, so that the voltage-level detection circuit itself produces the main voltage detection signal DET0, the first voltage detection signal DET1 or the second voltage detection signal DET2.

Therefore, the voltage-level detection circuit is connected between the upstream midpoint P2 and the downstream midpoint N2, so that there exists a feature to enable commonly using for monitoring an output voltage of the main battery or that of the electric charging power-source apparatus; meanwhile, when the voltage-level detection circuit is mounted between the upstream power-supply point P1 and the downstream power-supply point N1, there exists a feature to enable monitoring whether or not an output voltage of the electric charging power-source apparatus is normal before the pair of electric charging contactors and the pair of main electric contactors are close-circuited.

Note that, the determination-voltage detection signal DET00 by means of the microprocessor is used, which is because welding determination is suitable by using, as a power source, the main battery that is generating a stable main power-source voltage Vaa; in this case, there exists a feature that the reception photocoupler is not required.

However, when abnormality detection of the electric charging contactors is performed by means of a ground-based electric charging power-source apparatus in a state in which the main electric contactors are open-circuited, it is desirable to use the main voltage detection signal DET0 in which an influence thereto by pulsating changes of the power-source voltage is difficult to be caused.

The voltage-level detection circuit 160A comprises the comparison circuit 169a to which a stable power-source voltage Vd is applied by means of a plurality of series connected current-limiting resistors 161 and the constant-voltage circuit 163 including the constant-voltage diode 163a which are connected between a positive power-source line subjected to detection and a negative power-source line thereto, and the voltage-level detection circuit is also configured in such a manner that: the intermittent control transistor 169b, the electric charging reactor 164 and the smoothing capacitor 165 connected in series with one another, and the plurality of current-limiting resistors 161 also connected in series therewith are connected between the positive power-source line and the negative power-source line; the smoothing capacitor 165 is connected in parallel with a series-connected circuit constituting of the light-emitting diode of the reception photocoupler 166a and of the electrical discharge resistor 168a, and is connected in parallel with negative feedback voltage-divider resistors 168b and 168c; a voltage generated downstream of the negative feedback voltage-divider resistors 168b and 168c, and a voltage generated downstream of the voltage-divider resistors 168d and 168e with respect to a stable power-source voltage Vd are applied to comparison input terminals of the comparison circuit 169a, so that, by means of its comparison output, the intermittent control transistor 169b is intermittently controlled, and a negative feedback control is performed so that an electric charging voltage Vx of the smoothing capacitor 165 is in the relationship proportional to the stable power-source voltage Vd; and a light-emitting diode of the intermittent reception photocoupler 166b is connected between an interconnection point of the intermittent control transistor 169b and the electric charging reactor 164, and a negative power-source line being the negative side of the constant-voltage circuit 163.

And then, the light-emitting diode of the intermittent reception photocoupler 166b is a light-emitting diode which produces, in a switch-off time-period of the intermittent control transistor 169b, the voltage-level detection signal DETV being a pulse signal voltage in such a manner that an induced current of the electric charging reactor 164 flows back by way of the smoothing capacitor 165; it is so arranged that a conduction duty or conduction period being a ratio of a switch-on time-period of the voltage-level detection signal DETV to a switch-on/switch-off period thereof changes in response to a currently going voltage between the positive power-source line and the negative power-source line, and in contrast that the main voltage detection signal DET0 is produced by a transistor output of the reception photocoupler 166a.

As described above, the voltage-level detection circuit includes the reception photocoupler that produces the main voltage detection signal by reacting in response to the presence or absence of a detected voltage being a voltage between the positive power-source line and the negative power-source line, and the intermittent reception photocoupler that performs an intermittent operation by means of a conduction duty or conduction period which reacts in response to the magnitude of a detected voltage.

Therefore, it is not required to provide a constant-voltage power-source circuit(s) which is insulated on its circuitry in order to obtain a voltage detection signal(s), so that there exists a feature that the voltage-level detection signal can be produced with an inexpensive configuration.

Moreover, electric power is supplied into the reception photocoupler for producing the main voltage detection signal DET0 by the intermittent control transistor at all times, so that there exists a feature that power consumption of the current-limiting resistors can be curbed by increasing a conduction duty of the intermittent control transistor when a monitored voltage Vxx is small, and by decreasing the conduction duty of the intermittent control transistor when the monitored voltage Vxx is large.

Embodiment 2

Hereinafter, the explanation will be made in more detail, focusing on different points to the apparatus in FIG. 1, for the configurations referring to FIG. 9 that is an overall circuit block diagram of an electric charging control device according to Embodiment 2 of the present invention.

Note that, in each of the figures, the same reference numerals and symbols designate the same items as, or the items corresponding to, those shown in the figures; the automotive electrical power conversion apparatus 100A is changed to an automotive electrical power conversion apparatus 100B, and the electric charging control device 130A, to an electric charging control device 130B; and so, the classification of embodiments is indicated by the uppercase letter of English alphabet at the end of numeral symbols.

Figure 9:
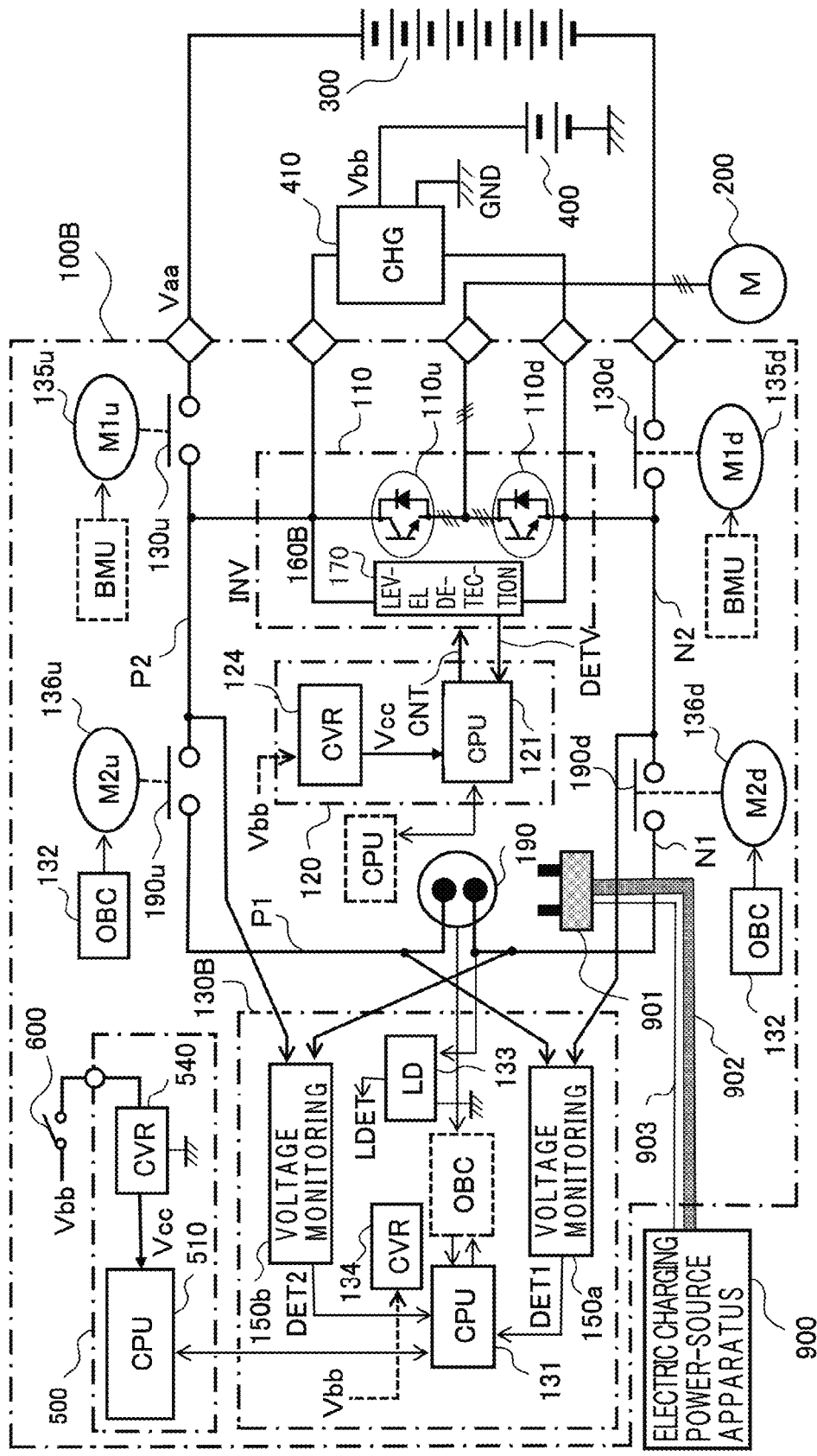
FIG. 9 is an overall circuit block diagram of an automotive electrical power conversion apparatus including an electric charging control device according to Embodiment 2 of the present invention.

In FIG. 9, a first different point to the items of FIG. 9 from those of FIG. 1 is that, in the electric charging control device 130B in FIG. 9, the first voltage monitoring circuit 150a and the second voltage monitoring circuit 150b are utilized, each of which is a power-saving type in comparison with those of FIG. 1; as already described above, the explanation for the details of the first voltage monitoring circuit 150a and the second voltage monitoring circuit 150b is made referring to FIG. 3.

As a second different point, an arrangement is made in which the first voltage monitoring circuit 150a and the second voltage monitoring circuit 150b are connected in a crossing manner with respect to each other between respective input and output terminals of the upstream and downstream electric-charging contactors 190u and 190d; this will be described later referring to FIG. 10.

A third different point is that, as for a voltage-level detection circuit 160B (or 170) mounted in the inverter 110, a voltage-level detection circuit of a simple type is used which only generates the voltage-level detection signal DETV, and does not generate the main voltage detection signal DET0. As for the voltage-level detection circuit 160B, the explanation has already been made referring to FIG. 4; and, as for the voltage-level detection circuit 170, the explanation will be made later referring to FIG. 11.

Hereinafter, on the basis of these different points, the explanation will be made for the general outlines in their entirety referring to the overall block diagram of FIG. 9.

It is so arranged that, to the automotive electrical power conversion apparatus 100B, the vehicle driving motors 200 are connected into which electric power is supplied through from the main battery 300 to drive them by means of the inverter 110, and also that, to the apparatus, connected by means of the buck charging device 410 is the auxiliary battery 400 which is thereby charged through from the main battery 300. The apparatus is further arranged to include the upper-level control device 500 having the upper-level control CPU 510 therein, and to connect the electric charging power-source apparatus 900 being a ground-based facility.

In addition, to the electric charging power-source apparatus 900, the electric charging plug 901 is connected by way of the power-source lines 902 and the signal line 903; and the signal line 903 is a signal line through which transmitted to the upper-level control CPU 510 is a signal for detecting whether or not the electric charging plug 901 is connected to the electric charging plug entrance 190 on an automotive vehicle side, and for detecting whether or not a plug cover is closed under lock as will be described later.

The inverter 110 being a prime constituent element of the automotive electrical power conversion apparatus 100B includes the upstream switch-on/switch-off devices 110u and the downstream switch-on/switch-off devices 110d; and the inverter's series upstream ends are connected to the positive electrode terminal of the main battery 300 by way of the upstream main contactor 130u, and the inverter's series downstream ends are connected to the negative electrode terminal of the main battery 300 by way of the downstream main contactor 130d.

The electric motor control device 120 (MCU) operating in collaboration with the inverter 110 includes the electric motor control CPU 121 for performing serial communications of control and monitoring signals between the CPU and the upper-level control device 500, and the stabilized power source 124 into which electric power is supplied from the auxiliary battery 400 to generate a stabilized voltage Vcc, which is supplied into the electric motor control CPU 121.

The upstream electric-charging contactor 190u is connected between an upstream midpoint P2 being a series connection point with the upstream main contactor 130u, and an upstream power-supply point P1 which is connected to a positive power-source line of the electric charging power-source apparatus 900 by way of the electric charging plug 901.

Similarly, the downstream electric-charging contactor 190d is connected between a downstream midpoint N2 being a series connection point with the downstream main contactor 130d, and a downstream power-supply point N1 which is connected to a negative power-source line of the electric charging power-source apparatus 900 by way of the electric charging plug 901.

It is so arranged that the energizing coils M1u and M1d of the upstream and downstream main contactors 130u and 130d can be individually driven to close-circuit the respective contactor by means of the electric charging control CPU 131, and that the upstream and downstream electric-charging contactors 190u and 190d can be individually driven to close-circuit the respective contactor by means of the electric charging instruction device 132 to which an open-circuit/close-circuit instruction signal is transmitted from the upper-level control CPU 510.

The electric charging control device 130B for performing open-circuit/close-circuit control on the main electric contactors 130u and 130d includes the electric charging control CPU 131 for performing serial communications of control and monitoring signals between the CPU and the upper-level control device 500, and the stabilized power source 134 into which electric power is supplied from the auxiliary battery 400 to generate a stabilized voltage Vcc, which is supplied into the electric charging control CPU 131.

The electric charging control device 130B also includes the first voltage monitoring circuit 150a connected between the upstream power-supply point P1 and the downstream midpoint N2, and the second voltage monitoring circuit 150b connected between the upstream midpoint P2 and the downstream power-supply point N1, it is so arranged that the voltage monitoring circuit produces the first voltage detection signal DET1 and the second voltage detection signal DET2 each of which is a logic signal for detecting the presence or absence of a line-to-line voltage depending on whether or not a voltage between a positive power-source line and a negative power-source line is a predetermined threshold-value voltage being set in advance or more.

In the electric charging control device 130B, the earth-leakage detection circuit 133 is also mounted for measuring the earth-leakage resistance between the upstream power-supply point P1 (or the downstream power-supply point N1 may also be suitable therefor) and the automotive vehicle's bodywork; it is so arranged that, in accordance with the presence or absence of earth-leakage abnormality, the earth-leakage detection signal LDET is produced, which is transmitted to the upper-level control CPU 510.

It can be known that the electric charging instruction devices 132 are remote terminals placed at positions close to the electric charging contactors 190u and 190d; however, when the electric charging contactors 190u and 190d are placed at positions close to the electric charging control device 130B, it may be adopted that the electric charging instruction devices 132 and the electric charging control device 130B are integrally made with one another, and the electric charging contactors 190u and 190d are directly driven from the electric charging control device 130B.

Meanwhile, when the main electric contactors 130u and 130d are placed at positions remote to the electric charging control device 130B, it may be adopted that remote terminals are mounted at positions immediately close to the main electric contactors 130u and 130d, which are driven to be open-circuited/close-circuited from the upper-level control CPU 510 or the electric charging control CPU 131.

In addition, in place of the first voltage monitoring circuit 150a or the second voltage monitoring circuit 150b, the first voltage monitoring circuit 140a or the second voltage monitoring circuit 140b described above in FIG. 2 is applicable, respectively, or the voltage-level detection circuit 160A described above in FIG. 4 may also be applicable therefor.

Next, the explanation will be made for FIG. 10 that is a system diagram of an electric charging circuit for the apparatus in FIG. 9.

Figure 10:
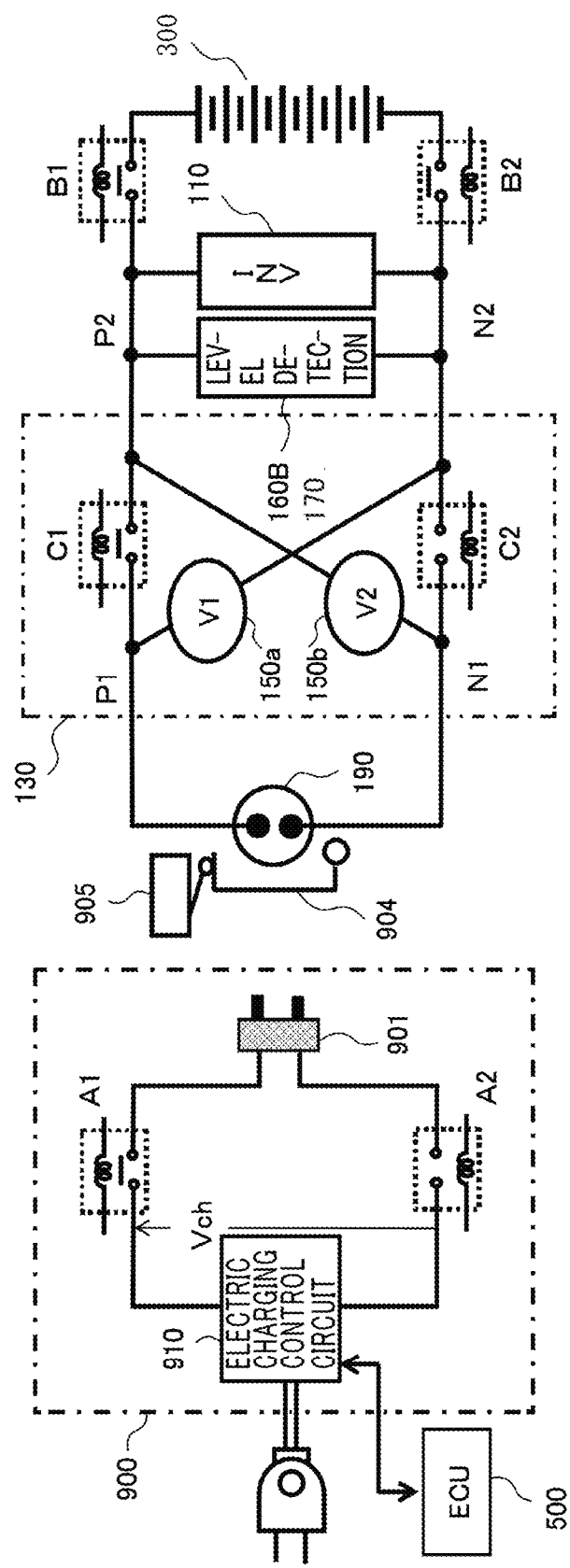
FIG. 10 is a system diagram of an electric charging circuit in the electric charging control device according to Embodiment 2 of the present invention.

In FIG. 10, the electric charging power-source apparatus 900 connected to a ground-based power source is principally constituted of an electric charging control circuit 910 for generating an electric charging output voltage Vch with respect to the main battery 300 mounted aboard an automotive vehicle.

The electric charging control circuit 910 is a circuit which connects the upper-level control device 500 therebetween by a serial signal line, and produces a control output to achieve not more than a maximum output voltage and a maximum charging current which are instructed according to the occurrence of an electric charging instruction, so that the generation of output voltage is halted under the condition that a minimum charging current having been instructed or less is reached, or that a predetermined charging time has elapsed, thereby completing the electric charging.

Note that, to output portions of the electric charging control circuit 910, the electric charging plug 901 is connected by way of a facility-side electric contactor on the upstream side (abbreviated as a "facility upper-contact A1"), and a facility-side electric contactor on the downstream side (abbreviated as a "facility lower-contact A2").

Upon the electric charging plug entrance 190 on an automotive vehicle side, the plug cover 904 is mounted; it is so arranged that a close detection switch 905 produces a close-circuit signal when the plug cover 904 is closed under lock.

To the plug cover 904, a restraint mechanism is added which is not shown in the figures, and, when it is in a state of "opening prohibited," the plug cover 904 is arranged so that it cannot be released to be open.

The first voltage monitoring circuit (abbreviated as a "V1") 150a and the second voltage monitoring circuit (abbreviated as a "V2") 150b are connected in a crossing manner with respect to each other, so that the first voltage monitoring circuit monitors a line-to-line voltage between the upstream power-supply point P1 and the downstream midpoint N2, and the second voltage monitoring circuit monitors a line-to-line voltage between the upstream midpoint P2 and the downstream power-supply point N1.

Therefore, when the comparison is made with a case of FIG. 2, a high voltage due to the main battery 300 does not result in being generated on the electric charging plug entrance 190, in the case of FIG. 2, by giving an open-circuit instruction to all of the contacts, even if there exists welding abnormality in either one of the electric charging upper contact C1 and the main upper contact B1, and what is more, there exists welding abnormality in either one of the electric charging lower contact C2 and the main lower contact B2.

However, in a case of FIG. 10, the upstream midpoint P2 and the downstream power-supply point N1 are connected by way of the second voltage monitoring circuit 150b, and the downstream midpoint N2 and the upstream power-supply point P1 are connected by way of the first voltage monitoring circuit 150a, a high voltage due to the main battery 300 results in being generated on the electric charging plug entrance 190, if welding abnormality is caused in any one of the main upper contact B1 or the main lower contact B2; and therefore, in this case, it is required to prohibit releasing the plug cover 904 to be open.

Meanwhile, in the case of FIG. 10 as will be described later in FIG. 13 and FIG. 14, there exists a feature that abnormality inspection operations on the electric charging upper contact C1 and the electric charging lower contact C2 are simplified, and that an inspection time is shortened.

Next, the explanation will be made for FIG. 11 that is a circuit diagram showing the voltage-level detection circuit 170 of FIG. 9.

Figure 11:
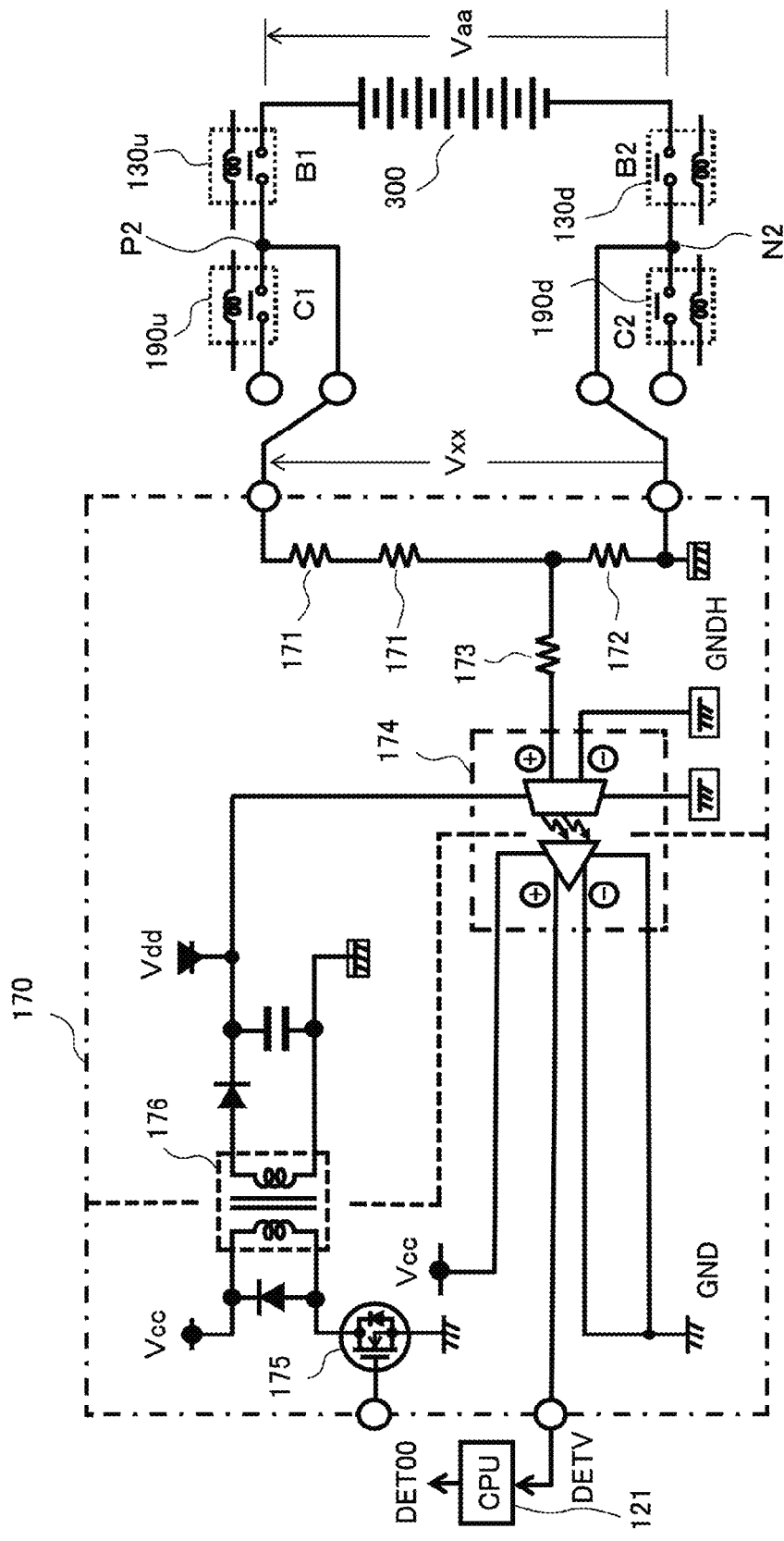
FIG. 11 is a circuit diagram illustrating a voltage-level detection circuit in the electric charging control device according to Embodiment 2 of the present invention.

In FIG. 11, the voltage-level detection circuit 170 includes a plurality of upstream voltage-divider resistors 171, 171, and a downstream voltage-divider resistor 172 which are connected between the upstream midpoint P2 and the downstream midpoint N2; the downstream midpoint N2 is indicated by an appropriate and virtual high-voltage ground GNDH.

The positive-side input terminal of an optically isolated amplifier 174 is connected to the upstream end of the downstream voltage-divider resistor 172 through an input resistor 173, and the negative-side input terminal is connected to the high-voltage ground GNDH together with the downstream end of the downstream voltage-divider resistor 172.

The optically isolated amplifier 174 converts a received analog input voltage into a first digital value of ten bits, for example; a first digital signal of these values is isolated by ten photocouplers, and is converted into a second digital signal of the same ten bits in output portions of those photocouplers; and an analog signal reconstructed back to an analog value from the second digital signal by means of a digital-to-analog (DA) conversion circuit is inputted into the electric motor control CPU 121 as the voltage-level detection signal DETV.

Therefore, it is so arranged that the analog signal having been obtained is a highly accurate signal in a 0.1% degree, and also that, in preferable environments where pulsating voltages being factors responsible for noise misoperations are not generated because the inverter 110 is not operating when an abnormality inspection(s) of the contactors is performed, the electric motor control CPU 121 compares with an initial setting numeric value being a predetermined determination threshold-value being set in advance and produces the determination-voltage detection signal DET00 being a logic signal indicating the presence or absence of a monitored voltage.

Note that, an insulated power-source voltage Vdd for operating the optically isolated amplifier 174 is electrically insulated by an insulation power-source circuit 176; the insulation power-source circuit 176 works as an insulating transformer through which electric power is continually supplied by an intermittent switch-on/switch-off device 175 from a stabilized voltage Vcc where the stabilized power source 124 generates.

As described above, such an expensive and highly accurate voltage-level detection circuit 170 is a circuit for performing a highly accurate motor control, and so, by effectively making use of the circuit, it is so arranged that the determination-voltage detection signal DET00 for performing an abnormality inspection(s) of the contactors can be obtained.

Hereinafter, as to the electric charging control device 130B configured as shown in FIG. 9, FIG. 10 and FIG. 11 according to Embodiment 2 of the present invention, the explanation will be made in more detail for the working-effects and operations.

First, in FIG. 9 illustrating the overall circuit block diagram, the electric charging control device 130B is integrally configured as a portion of the automotive electrical power conversion apparatus 100B. It is so arranged that: the automotive electrical power conversion apparatus 100B includes the inverter 110 and the electric motor control device 120; the inverter 110 measures an intermediate voltage by the voltage-level detection circuit 160B (or 170) connected between the upstream midpoint P2 being a connection point of the upstream main contactor 130u and the upstream electric charging contactor 190u, and the downstream midpoint N2 being a connection point of the downstream main contactor 130d and the downstream electric charging contactor 190d; and the inverter produces the voltage-level detection signal DETV being a pulse signal or an analog signal which is inputted into the electric motor control CPU 121, so that the electric motor control CPU 121 produces the determination-voltage detection signal DET00.

In addition, it is so arranged that, in the electric charging control device 130B, the first voltage monitoring circuit 150a connected between the upstream power-supply point P1 and the downstream midpoint N2 produces the first voltage detection signal DET1 by reacting in response to the presence or absence of a monitored voltage, and that the second voltage monitoring circuit 150b connected between the upstream midpoint P2 and the downstream power-supply point N1 produces the second voltage detection signal DET2 by reacting in response to the presence or absence of a monitored voltage.

Figure 12:
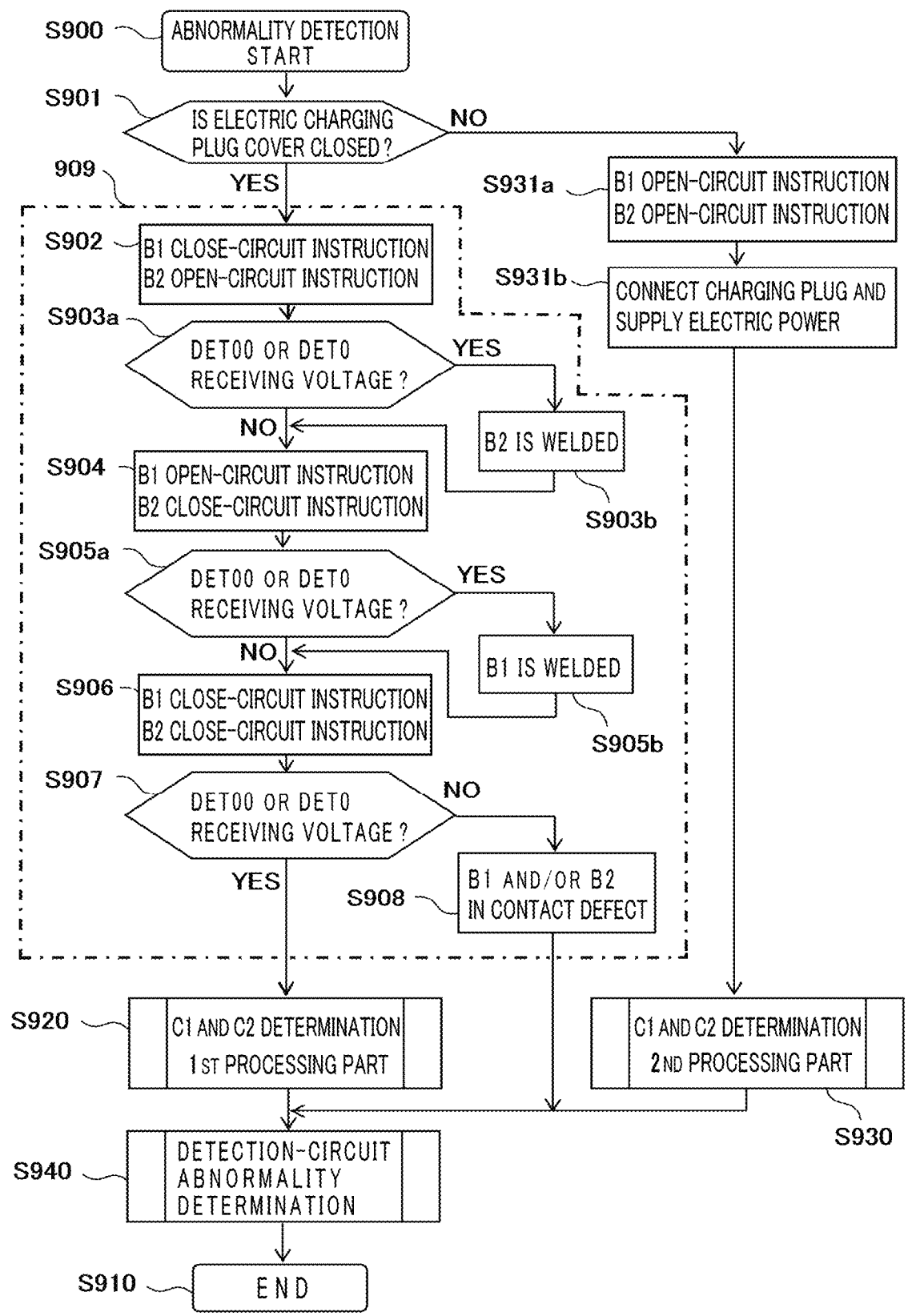
FIG. 12 is an overall flowchart for explaining abnormality inspection operations in the electric charging control device according to Embodiment 2 of the present invention.

FIG. 12 is an overall flowchart for explaining abnormality inspection operations of the apparatus in FIG. 9; the explanation will be made referring to FIG. 9, FIG. 10 and FIG. 11 in more detail for the working-effects and operations.

In FIG. 12, as for the Step numbers in this figure, the Step numbers of 600's in FIG. 6 described above are replaced by those of 900's. Other than the next different points, those constituent items or portions are equivalent or similar to those in the case of FIG. 6; thus, the explanation is omitted for the same items or portions.

A first different point is a point in which Step S631c in FIG. 6 is cancelled; this is because the first voltage monitoring circuit 150a in FIG. 9 and the second voltage monitoring circuit 150b therein do not include the function of producing the voltage-level detection signal DETV.

Figure 13:
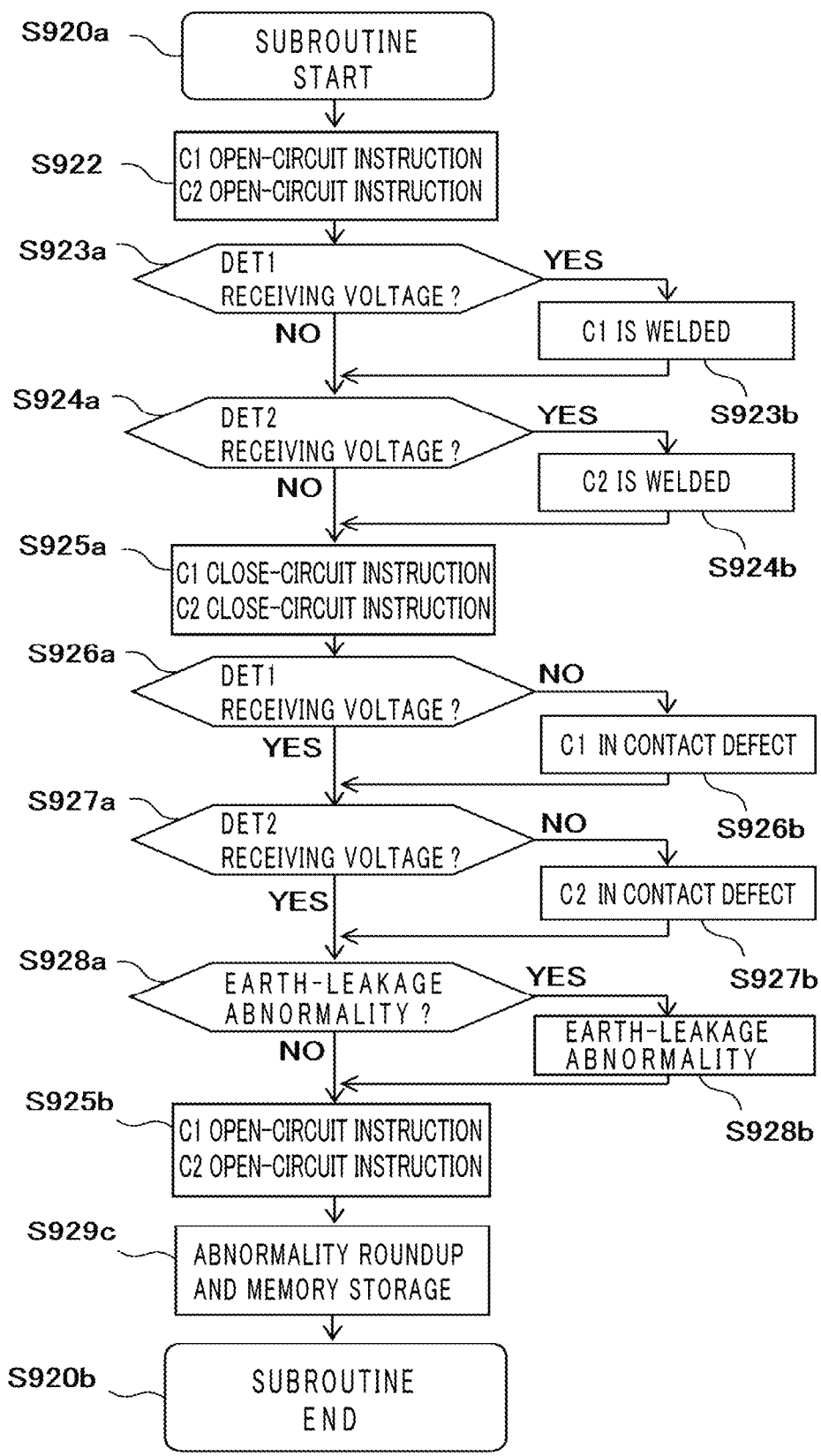
FIG. 13 is a detailed flowchart of a first processing part within the overall flowchart shown in FIG. 12.
Figure 14:
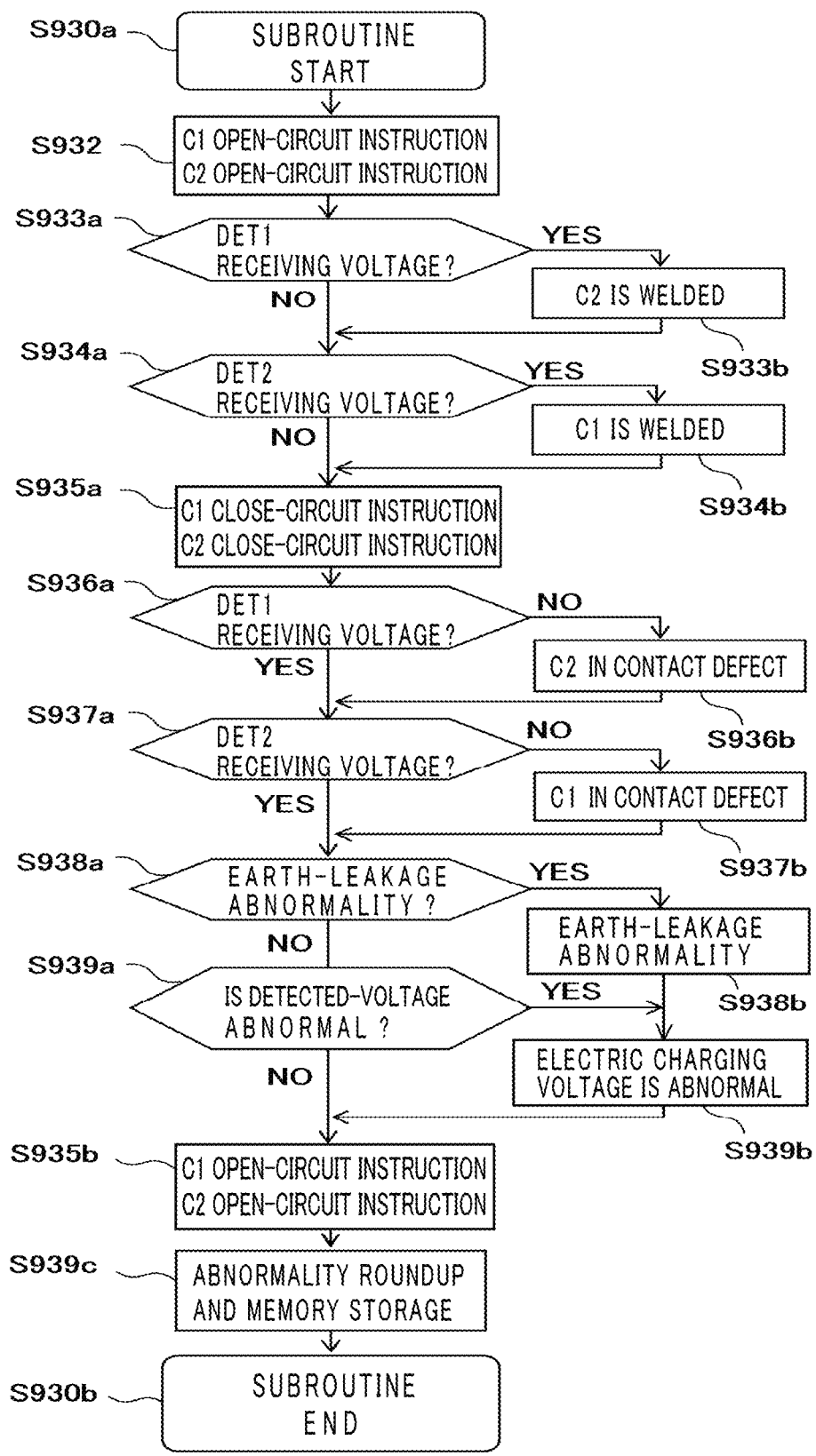
FIG. 14 is a detailed flowchart of a second processing part within the overall flowchart shown in FIG. 12.

A second different point is a point in which a processing block S920 and a processing block S930 used in place of the processing block S620 of FIG. 6 and the processing block S630 thereof are as those exactly shown in FIG. 13 and FIG. 14, respectively.

A processing block S940 executed subsequent to the processing block S920, S930 or Step S908 is a processing block which becomes as a detection-circuit abnormality determination means. In the detection-circuit abnormality determination means 940, it is so arranged that: in a first power-supply state in which the electric charging plug 901 is not inserted and the pair of main electric contactors 130u and 130d is close-circuited, or in a second power-supply state in which the pair of main electric contactors 130u and 130d is open-circuited and electric power is supplied from the electric charging power-source apparatus 900 after the electric charging plug 901 is inserted, determination results are compared at three points with one another by means of the determination-voltage detection signal DET00, and the first voltage detection signal DET1 and the second voltage detection signal DET2, each related to the presence or absence of a respective point's detection voltage in accordance with the pair of electric charging contactors 190u and 190d which is together open-circuited and then close-circuited; and also determination is made so that abnormality of the voltage-level detection circuit 160B (or 170) is caused, when the first voltage detection signal DET1 and the second voltage detection signal DET2 both indicate the presences of voltage detection and when the determination-voltage detection signal DET00 indicates the absence of voltage detection, or when the first voltage detection signal DET1 and the second voltage detection signal DET2 both indicate the absences of voltage detection and when the determination-voltage detection signal DET00 indicates the presence of voltage detection.

At Operation-End Step S910 following the processing block S940, it is so arranged that another control program is executed, and that the processing returns for a second time to Operation-Start Step S900 within a predetermined limiting time, when an abnormality detection time-duration is continued.

FIG. 13 is a diagram showing a flowchart for explaining the operations of the processing block S920 within the overall flowchart of FIG. 12.

In FIG. 13, Step S920a is Operation-Start Step of the subroutine program.

The following Step S922 is a process step in which open-circuit instructions are given together to the electric charging upper contact C1 in FIG. 10 and the electric charging lower contact C2 therein, and the processing moves to Step S923a.

Step S923a is a determination process step in which, when the first voltage detection signal DET1 indicates superiority and when a monitored voltage between the upstream power-supply point P1 and the downstream midpoint N2 is a predetermined value or more, determination of "YES" is made because of the presence of the received voltage, so that the processing moves to Step S923b; and else determination of "NO" is made because of the absence indicating inferiority without receiving voltage, so that the processing moves to Step S924a.

At Step S923b, the electric charging upper contact C1 is welded, which is stored in memory; and the processing moves to Step S924a.

Step S924a is a determination process step in which, when the second voltage detection signal DET2 indicates superiority and when a monitored voltage between the upstream midpoint P2 and the downstream power-supply point N1 is a predetermined value or more, determination of "YES" is made because of the presence of the received voltage, so that the processing moves to Step S924b; and else determination of "NO" is made because of the absence indicating inferiority without receiving voltage, so that the processing moves to Step S925a.

At Step S924b, the electric charging lower contact C2 is welded, which is stored in memory; and the processing moves to Step S925a.

Step S925a is a process step in which close-circuit instructions are given together to the electric charging upper contact C1 in FIG. 10 and the electric charging lower contact C2 therein, and the processing moves to Step S926a.

Step S926a is a determination process step in which, when the first voltage detection signal DET1 indicates superiority and when a monitored voltage between the upstream power-supply point P1 and the downstream midpoint N2 is a predetermined value or more, determination of "YES" is made because of the presence of the received voltage, so that the processing moves to Step S927a; and else determination of "NO" is made because of the absence indicating inferiority without receiving voltage, so that the processing moves to Step S926b.

At Step S926b, the electric charging upper contact C1 is in a contact defect, which is stored in memory; and the processing moves to Step S927a.

Step S927a is a determination process step in which, when the second voltage detection signal DET2 indicates superiority and when a monitored voltage between the upstream midpoint P2 and the downstream power-supply point N1 is a predetermined value or more, determination of "YES" is made because of the presence of the received voltage, so that the processing moves to Step S928a; and else determination of "NO" is made because of the absence indicating inferiority without receiving voltage, so that the processing moves to Step S927b.

At Step S927b, the electric charging lower contact C2 is in a contact defect, which is stored in memory; and the processing moves to Step S928a.

Step S928a is a determination process step in which the earth-leakage detection circuit 133 mounted in the electric charging control device 130B measures earth-leakage resistance between a high-voltage circuit system principally constituted of the main battery 300 and the inverter 110, and the automotive vehicle's bodywork; determination of "YES" is made when the insulation resistance does not possess a predetermined value or more, so that the processing moves to Step S928b; and else determination of "NO" is made when sufficient insulation resistance is possessed, so that the processing moves to Step S925b.

At Step S928b, an occurrence of earth-leakage abnormality state is stored in memory, and the processing moves to Step S926b.

At Step S925b, the electric charging upper contact C1 and the electric charging lower contact C2 both being driven to be close-circuited at Step S925a are de-energized so as to be open-circuited, and afterward, the processing moves to Step S929c.

At Step S929c, the presence or absence of abnormality occurrence in the upstream and downstream electric-charging contactors 190u and 190d and its category, and the presence or absence of earth-leakage abnormality are stored in memory, the processing moves to Operation-End Step S920b of the subroutine program; subsequently, it is so arranged that the processing moves to the processing block S940 of FIG. 12.

FIG. 14 is a diagram showing a flowchart for explaining the operations of the processing block S930 within the overall flowchart of FIG. 12.

In FIG. 14, Step S930a is Operation-Start Step of the subroutine program.

The following Step S932 is a process step in which open-circuit instructions are given together to the electric charging upper contact C1 in FIG. 10 and the electric charging lower contact C2 therein, and the processing moves to Step S933a.

Step S933a is a determination process step in which, when the first voltage detection signal DET1 indicates superiority and when a monitored voltage between the upstream power-supply point P1 and the downstream midpoint N2 is a predetermined value or more, determination of "YES" is made because of the presence of the received voltage, so that the processing moves to Step S933b; and else determination of "NO" is made because of the absence indicating inferiority without receiving voltage, so that the processing moves to Step S934a.

At Step S933b, the electric charging lower contact C2 is welded, which is stored in memory; and the processing moves to Step S934a.

Step S934a is a determination process step in which, when the second voltage detection signal DET2 indicates superiority and when a monitored voltage between the upstream midpoint P2 and the downstream power-supply point N1 is a predetermined value or more, determination of "YES" is made because of the presence of the received voltage, so that the processing moves to Step S934b; and else determination of "NO" is made because of the absence indicating inferiority without receiving voltage, so that the processing moves to Step S935a.

At Step S934b, the electric charging upper contact C1 is welded, which is stored in memory; and the processing moves to Step S935.

Step S935a is a process step in which close-circuit instructions are given together to the electric charging upper contact C1 in FIG. 10 and the electric charging lower contact C2 therein, and the processing moves to Step S936a.

Step S936a is a determination process step in which, when the first voltage detection signal DET1 indicates superiority and when a monitored voltage between the upstream power-supply point P1 and the downstream midpoint N2 is a predetermined value or more, determination of "YES" is made because of the presence of the received voltage, so that the processing moves to Step S937a; and else determination of "NO" is made because of the absence indicating inferiority without receiving voltage, so that the processing moves to Step S936b.

At Step S936b, the electric charging lower contact C2 is in a contact defect, which is stored in memory; and the processing moves to Step S937a.

Step S937a is a determination process step in which, when the second voltage detection signal DET2 indicates superiority and when a monitored voltage between the upstream midpoint P2 and the downstream power-supply point N1 is a predetermined value or more, determination of "YES" is made because of the presence of the received voltage, so that the processing moves to Step S938a; and else determination of "NO" is made because of the absence indicating inferiority without receiving voltage, so that the processing moves to Step S937b.

At Step S937b, the electric charging upper contact C1 is in a contact defect, which is stored in memory; and the processing moves to Step S938a.

Step S938a is a determination process step in which the earth-leakage detection circuit 133 mounted in the electric charging control device 130B measures the earth-leakage resistance between a high-voltage circuit system principally constituted of the inverter 110 and the automotive vehicle's bodywork; determination of "YES" is made when the insulation resistance does not possess a predetermined value or more, so that the processing moves to Step S938b; and else determination of "NO" is made when sufficient insulation resistance is possessed, so that the processing moves to Step S939a.

At Step S938b, an occurrence of earth-leakage abnormality state is stored in memory, and the processing moves to Step S939b as will be described later.

Step S939a is a determination process step in which a generated voltage of the electric charging power-source apparatus 900 is measured using the voltage-level detection circuit 160B (or 170) mounted in the inverter 110 in an open-circuited state of the main electric contactors 130u and 130d, and determination is performed whether or not the generated voltage is a voltage in an appropriate range; determination of "YES" is made when there exists abnormality, so that the processing moves to Step S939b; and else determination of "NO" is made when there does not exist abnormality, so that the processing moves to Step S935b.

It should be noted that, Step S939a is a process step which becomes a detected-voltage abnormality determination means.

At Step S939b, an occurrence of electric charging voltage abnormality is stored in memory, and the processing moves to Step S935b.

At Step S935b, the electric charging upper contact C1 and the electric charging lower contact C2 both being driven to be close-circuited at Step S935a are de-energized so as to be open-circuited, and afterward, the processing moves to Step S939c.

At Step S939c, the presence or absence of abnormality occurrence in the upstream and downstream electric-charging contactors 190u and 190d and its category, and the presence or absence of earth-leakage abnormality are stored in memory, the processing moves to Operation-End Step S930b of the subroutine program; subsequently, it is so arranged that the processing moves to the processing block S940 of FIG. 12.

As is clear in the explanation above, it is possible to use, as a voltage monitoring circuitry which produces a determination logic output whether or not a monitored voltage is a predetermined value or more, the first voltage monitoring circuits 140a and 150a, or the second voltage monitoring circuits 140b and 150b, and is possible to use the voltage-level detection circuit 160A having the main voltage detection signal DET0; meanwhile, even with the voltage-level detection circuit 160B or 170 for only producing the voltage-level detection signal DETV, it is also made possible to produce the determination-voltage detection signal DET00 by performing the comparison with a predetermined numeric value in the electric motor control CPU 121 or the electric charging control CPU 131.

Moreover, in the voltage-level detection circuit 160A of FIG. 4, when the intermittent reception photocoupler 166b is cancelled and the production of the voltage-level detection signal DETV is withdrawn from service, there exists a feature to enable significantly curbing power consumption for obtaining the main voltage detection signal DET0 by means of the reception photocoupler 166a; such a circuit can be used as the first voltage monitoring circuit and/or the second voltage monitoring circuit.

As is clear in the explanation above, the electric charging control device 130B according to Embodiment 2 of the present invention comprises the electric charging control CPU 131 whose electric power is supplied from the auxiliary battery 400 which has a lower voltage than that of the main battery 300 and is electrically insulated between these low and high voltages to each other, for serially connecting with respect to the upper-level control device 500 which performs centralized control of the automotive electrical power conversion apparatus 100B, and for constituting a portion of the automotive electrical power conversion apparatus 100B including the inverter 110 for supplying electric power of three-phase alternating-current voltages to the vehicle driving motors 200 through from the main battery 300 mounted aboard an automotive vehicle, the pair of main electric contactors 130u and 130d connected between the main battery 300 and the inverter 110 at their upstream position and their downstream position, and the electric motor control device 120 operating with respect to the inverter 110, and also additively including the pair of electric charging contactors 190u and 190d whose one ends each are connected with respect to the upstream power-supply point P1 and the downstream power-supply point N1 which are connected to the electric charging plug 901 provided for the electric charging power-source apparatus 900 being a ground-based device, and whose other ends being the upstream midpoint P2 and the downstream midpoint N2 are connected in series with the pair of main electric contactors 130u and 130d. The electric charging control device 130B for performing open-circuit/close-circuit control on at least one of the pair of main electric contactors 130u and 130d and the pair of electric charging contactors 190u and 190d is characterized in that the upper-level control device 500 further comprises the upper-level control CPU 510 for performing mutual monitoring by means of a serial communications circuit between the electric charging power-source apparatus 900, the electric motor control CPU 121 mounted on the electric motor control device 120, the electric charging instruction device 132 for driving to close-circuit the pair of electric charging contactors 190u and 190d, and the electric charging control CPU 131 for driving the pair of main electric contactors 130u and 130d, and for performing communications of a control signal therebetween.

And then, the electric charging control CPU 131 is connected to the first voltage monitoring circuit 150a connected between the upstream power-supply point P1 and the downstream midpoint N2, for producing the first voltage detection signal DET1 insulated between a high voltage thereon and a low voltage thereon, and to the second voltage monitoring circuit 150b connected between the downstream power-supply point N1 and the upstream midpoint P2, for producing the second voltage detection signal DET2 insulated between a high voltage thereon and a low voltage thereon; the first voltage monitoring circuit 150a and the second voltage monitoring circuit 150b produce the first voltage detection signal DET1 and the second voltage detection signal DET2, respectively, each of which is a determination logic signal responding to the presence or absence of a monitored voltage; the inverter 110 further comprises the voltage-level detection circuit 160B (or 170) for determining whether or not a main power-source voltage Vaa of a high voltage is applied from the main battery 300, and for producing the determination-voltage detection signal DET00 by way of the electric motor control CPU 121 by producing thereto the voltage-level detection signal DETV insulated between a high voltage thereon and a low voltage thereon; and the upper-level control CPU 510 comprises a control program constituting of a main contactor abnormality detection means 909 executed in cooperation with the electric charging control CPU 131, a first electric charging contactor abnormality detection means 920 executed in a state in which the pair of main electric contactors 130u and 130d is close-circuited under a condition that the electric charging plug 901 is not connected, and a second electric charging contactor abnormality detection means 930 executed in a state in which the pair of main electric contactors 130u and 130d is open-circuited under a condition that the electric charging plug 901 is connected and electric power is supplied from the electric charging power-source apparatus 900.

And also, the main contactor abnormality detection means 909 is a means for distinguishably determining the presence or absence of welding abnormality of those main electric contactors or a contact defect thereof on a one-by-one basis, in a non-connection state of the electric charging plug 901, corresponding to a combination state of a drive instruction with respect to the pair of main electric contactors 130u and 130d, and corresponding to the determination-voltage detection signal DET00; the first electric charging contactor abnormality detection means 920 is a means for distinguishably determining the presence or absence of welding abnormality of those electric charging contactors or a contact defect thereof on a one-by-one basis corresponding to a combination state of a drive instruction with respect to the pair of electric charging contactors 190u and 190d, and corresponding to a detection logic of the first voltage detection signal DET1 and that of the second voltage detection signal DET2; the second electric charging contactor abnormality detection means 930 either subsumes the detected-voltage abnormality determination means 939a for determining whether or not a generated voltage of the electric charging power-source apparatus 900 detected by the voltage-level detection circuit 160B (or 170) is within a predetermined threshold-value range being set in advance, or comprises a means for distinguishably determining the presence or absence of welding abnormality of those charging contactors or a contact defect thereof on a one-by-one basis corresponding to at least a combination state of a drive instruction with respect to the pair of electric charging contactors 190u and 190d, and a detection logic of the first voltage detection signal DET1 and that of the second voltage detection signal DET2; and it is so arranged that the plug cover 904 is mounted on the electric charging plug entrance 190 of the electric charging plug 901, and that, when the plug cover 904 is open and the electric charging plug 901 is not inserted, at least one pair of the main electric contactors 130u and 130d and the electric charging contactors 190u and 190*d* is configured not to be driven for close-circuiting, and is also configured to prohibit a close-circuit instruction with respect to at least the other pair, when there exists welding abnormality in any one contactor of the pair of electric charging contactors 190*u* and 190*d*, and the pair of main electric contactors 130*u* and 130*d*.

The voltage monitoring circuitry comprises the first voltage monitoring circuit 150*a* connected between the upstream power-supply point P1 and the downstream midpoint N2 in a crossing manner with respect to the second voltage monitoring circuit 150*b*, for producing the first voltage detection signal DET1, and the second voltage monitoring circuit 150*b* connected between the downstream power-supply point N1 and the upstream midpoint P2 in a crossing manner with respect to the first voltage monitoring circuit 150*a*, for producing the second voltage detection signal DET2; the upper-level control CPU 510 further comprises a control program being the detection-circuit abnormality determination means 940 executed in cooperation with the electric charging control CPU 131; and it is so arranged that the detection-circuit abnormality determination means 940 compares, in a first power-supply state in which the electric charging plug 901 is not inserted and the pair of main electric contactors 130*u* and 130*d* is close-circuited, or in a second power-supply state in which the pair of main electric contactors 130*u* and 130*d* is open-circuited and electric power is supplied from the electric charging power-source apparatus 900 after the electric charging plug 901 is inserted, determination results at three points with one another by means of the determination-voltage detection signal DET00, and the first voltage detection signal DET1 and the second voltage detection signal DET2, each related to the presence or absence of a respective point's detection voltage in accordance with the pair of electric charging contactors 190*u* and 190*d* which is together open-circuited and then close-circuited.

And also, the detection-circuit abnormality determination means determines that the voltage-level detection circuit 160B (or 170) is abnormal, when the first voltage detection signal DET1 and the second voltage detection signal DET2 both indicate the presences of voltage detection and when the determination-voltage detection signal DET00 indicates the absence of voltage detection, or when the first voltage detection signal DET1 and the second voltage detection signal DET2 both indicate the absences of voltage detection and when the determination-voltage detection signal DET00 indicates the presence of voltage detection; and a close-locking mechanism operates to prohibit releasing the plug cover 904 to be open, or at least an open-caution notification means is provided, when welding abnormality of the main electric contactor(s) 130*u* and/or 130*d*, or the electric charging contactor(s) 190*u* and/or 190*d* is detected by the main contactor abnormality detection means 909, or by the first electric charging contactor abnormality detection means 920, respectively.

As described above, the detection-circuit abnormality determination means is included in which, in the first power-supply state by means of a main battery in which the electric charging plug is not inserted, or in the second power-supply state by means of an electric charging power-source apparatus in which the electric charging plug is inserted, the presence or absence of abnormality of the voltage-level detection circuit itself is determined by a majority logic using the determination-voltage detection signal, and the first and second voltage detection signals.

Therefore, by reacting in response to the presence or absence of abnormality of the voltage-level detection circuit itself, there exists a feature that it is made possible to produce at least an abnormality notification signal.

In addition, the first and second voltage monitoring circuits are connected in the crossing manner with respect to each other on the upstream sides of the pair of electric charging contactors and on the downstream sides thereof, whereby there exists a feature that the abnormality determination procedures of the electric charging contactors can be simplified.

The first and second voltage monitoring circuits 150*a* and 150*b* each include a plurality of series connected current-limiting resistors 151, the constant-voltage diode 153 and the transmission photocoupler 156*b* which are connected between a positive power-source line subjected to monitoring and a negative power-source line subjected thereto, and it is so arranged that: a light-emitting diode of the reception photocoupler 156*a* is connected through a series resistor 154 and in parallel with respect to the constant-voltage diode 153, and the smoothing capacitor 155 is connected in parallel with the light-emitting diode or to the constant-voltage diode 153; the transmission photocoupler 156*b* is driven to switch on by a first reference signal REF1 or a second reference signal REF2 in which the electric charging control CPU 131 produces, when voltage monitoring is performed thereby; and the first voltage detection signal DET1 or the second voltage detection signal DET2 is produced by a transistor output of the reception photocoupler 156*a*.

As described above, it is so arranged that, using the reception photocoupler that operates by a lowered voltage obtained from a monitored voltage by means of the current-limiting resistors and the constant-voltage diode, the first and second voltage monitoring circuits obtain the respective first and second voltage detection signals each of which is insulated between a high voltage side on the circuit and a low voltage side thereon; and it is so arranged that the lowered voltage is generated by reacting in response to a reference signal in which the transmission photocoupler produces when the voltage monitoring is performed.

Therefore, it is not required to provide a constant-voltage power-source circuit(s) which is insulated on its circuitry in order to obtain a voltage detection signal(s) and an isolated-type comparator-amplifier circuit therefor, and it is possible to obtain the first and second voltage detection signals for each of which, similarly to the case of FIG. 2, a determination logic signal is produced with an inexpensive configuration in such a manner that a detected voltage reaches a predetermined low voltage or more; and as a further feature, power consumption caused by the current-limiting resistors and the constant-voltage diode can be curbed.

Note that, this type of voltage monitoring circuitry being a power-saving type is a circuit which can also be applicable to any one of Embodiment 1 and Embodiment 2.

The voltage-level detection circuit 160B or 170 is a circuit for producing only the voltage-level detection signal DETV which is inputted into the electric motor control CPU 121 where the electric motor control CPU 121 produces digital data of a currently going value of a detected voltage, so that the presence or absence of the detected voltage is determined by comparing the digital data with a predetermined threshold value being set in advance, and that the determination-voltage detection signal DET00 is obtained; and the voltage-level detection signal DETV is insulated between a high voltage thereon and a low voltage thereon, and is made as an analog signal voltage which is proportional to a detected voltage, or as a pulse signal voltage whose pulse duty or pulse period changes in response to a detected voltage.

As described above, it is so arranged that the voltage-level detection circuit produces the voltage-level detection signal DETV that is either an analog signal voltage or a pulse signal voltage, which is inputted into the electric motor control CPU or the electric charging control CPU, and that the electric motor control CPU produces the determination-voltage detection signal DET00 which reacts in response to the presence or absence of a detected voltage.

Therefore, the voltage-level detection circuit is connected between the upstream midpoint P2 and the downstream midpoint N2, so that there exists a feature to enable commonly using for monitoring an output voltage of the main battery or that of the electric charging power-source apparatus.

Note that, the determination-voltage detection signal DET00 by means of the microprocessor is used, which is because welding determination is suitable by using, as a power source, the main battery that is generating a stable main power-source voltage Vaa; in this case, there exists a feature that the reception photocoupler is not required.

However, when abnormality detection of the electric charging contactors is performed by means of a ground-based electric charging power-source apparatus in a state in which the main electric contactors are open-circuited, it is desirable to use the main voltage detection signal DET0 in which an influence thereto by pulsating changes of the power-source voltage is difficult to be caused.

The voltage-level detection circuit 160B comprises the comparison circuit 169a to which a stable power-source voltage Vd is applied by means of the plurality of series connected current-limiting resistors 161 and the constant-voltage circuit 163 including the constant-voltage diode 163a which are connected between a positive power-source line subjected to detection and a negative power-source line thereto, and the voltage-level detection circuit is also configured in such a manner that: the intermittent control transistor 169b, the electric charging reactor 164 and the smoothing capacitor 165 connected in series with one another, and the plurality of current-limiting resistors 161 also connected in series therewith are connected between the positive power-source line and the negative power-source line; the smoothing capacitor 165 is connected in parallel with the electrical discharge resistor 168a, and in parallel with negative feedback voltage-divider resistors 168b and 168c; a voltage generated downstream of the negative feedback voltage-divider resistors 168b and 168c, and a voltage generated downstream of the voltage-divider resistors 168d and 168e with respect to a stable power-source voltage Vd are applied to comparison input terminals of the comparison circuit 169a, so that, by means of its comparison output, the intermittent control transistor 169b is intermittently controlled, and a negative feedback control is performed so that an electric charging voltage Vx of the smoothing capacitor 165 is in the relationship proportional to the stable power-source voltage Vd; and a light-emitting diode of the intermittent reception photocoupler 166b is connected between an interconnection point of the intermittent control transistor 169b and the electric charging reactor 164, and a negative power-source line being the negative side of the constant-voltage circuit 163.

And then, the light-emitting diode of the intermittent reception photocoupler 166b is a light-emitting diode which produces, in a switch-off time-period of the intermittent control transistor 169b, the voltage-level detection signal DETV being a pulse signal voltage in such a manner that an induced current of the electric charging reactor 164 flows back by way of the smoothing capacitor 165; it is so arranged that a conduction duty or conduction period being a ratio of a switch-on time-period of the voltage-level detection signal DETV to an switch-on/switch-off period thereof changes in response to a currently going voltage between the positive power-source line and the negative power-source line.

As described above, the voltage-level detection circuit includes the intermittent reception photocoupler that performs intermittent operations by means of a conduction duty or conduction period which reacts in response to the magnitude of a detected voltage.

Therefore, in order to obtain a voltage detection signal (s), it is not required to provide a constant-voltage power-source circuit(s) which is insulated on its circuitry, so that there exists a feature that the voltage-level detection signal DETV can be produced with an inexpensive configuration.

In the present invention, each of the embodiments can be freely combined, and/or each of the embodiments can be appropriately modified or eliminated without departing from the scope of the invention.

What is claimed is:

1. An electric charging control device, comprising
an electric charging control CPU whose electric power is supplied from an auxiliary battery which has a lower voltage than that of a main battery, for serially connecting with respect to an upper-level control device which performs centralized control of an automotive electrical power conversion apparatus, and for constituting the automotive electrical power conversion apparatus,
the automotive electrical power conversion apparatus including
an inverter for supplying electric power of three-phase alternating-current voltages to a vehicle driving motor from the main battery mounted aboard an automotive vehicle,
a pair of main electric contactors connected between the main battery and the inverter at an upstream position thereof and a downstream position thereof, and
an electric motor control device operating with respect to the inverter, and including a pair of electric charging contactors whose one ends each are connected with respect to an upstream power-supply point and a downstream power-supply point which are connected to an electric charging plug provided for an electric charging power-source apparatus being a ground-based device, and whose other ends being an upstream midpoint and a downstream midpoint are connected in series with the pair of main electric contactors, the electric charging control device for performing open-circuit and close-circuit control on at least one of the pair of main electric contactors and the pair of electric charging contactors,
wherein:
the upper-level control device further comprises an upper-level control CPU for performing mutual monitoring, via a communications circuit, between the electric charging power-source apparatus, an electric motor control CPU mounted on the electric motor control device, an electric charging instruction device for driving to close-circuit the pair of electric charging contactors, and the electric charging control CPU for driving the pair of main electric contactors, and for performing communications of a control signal therebetween;

the electric charging control CPU is connected to a first voltage monitoring circuit connected between the upstream power-supply point and the downstream power-supply point or the downstream midpoint, for producing a first voltage detection signal, and to a second voltage monitoring circuit connected between the downstream power-supply point and the upstream power-supply point or the upstream midpoint, for producing a second voltage detection signal;

the first voltage monitoring circuit and the second voltage monitoring circuit produce the first voltage detection signal being a determination logic signal responding to a presence or an absence of a monitored voltage and the second voltage detection signal being a determination logic signal responding to the presence or the absence of the monitored voltage, respectively, and, when the first voltage monitoring circuit and the second voltage monitoring circuit are connected between the upstream power-supply point and the downstream power-supply point, a voltage monitoring circuitry is made by at least one from among the first voltage monitoring circuit and the second voltage monitoring circuit, or made by both thereof;

the inverter further comprises a voltage-level detection circuit for determining whether or not a main power-source voltage of a high voltage is applied from the main battery, and for producing one from among a main voltage detection signal being a determination logic signal and a determination-voltage detection signal by way of the electric motor control CPU by producing a voltage-level detection signal thereto;

the upper-level control CPU comprises a control program constituting of a main contactor abnormality detection routine executed in cooperation with the electric charging control CPU, a first electric charging contactor abnormality detection routine executed in a state in which the pair of main electric contactors is close-circuited under a condition that the electric charging plug is not connected, and a second electric charging contactor abnormality detection routine executed in a state in which the pair of main electric contactors is open-circuited under a condition that the electric charging plug is connected and electric power is supplied from the electric charging power-source apparatus;

the main contactor abnormality detection routine distinguishably determines a presence or an absence of a welding abnormality of a main electric contactor among the pair of main electric contactors or a contact defect thereof on a one-by-one basis, in a non-connection state of the electric charging plug, corresponding to a combination state of a drive instruction with respect to the pair of main electric contactors, and corresponding to a detection logic of the main voltage detection signal or the determination-voltage detection signal;

the first electric charging contactor abnormality detection routine distinguishably determines the presence or the absence of the welding abnormality of an electric charging contactor among the pair of electric charging contactors or a contact defect thereof on a one-by-one basis corresponding to a combination state of a drive instruction with respect to the pair of electric charging contactors, and corresponding to a detection logic of the first voltage detection signal and that of the second voltage detection signal;

the second electric charging contactor abnormality detection routine includes a detected-voltage abnormality determination routine for determining whether or not a generated voltage of the electric charging power-source apparatus detected by the voltage-level detection circuit is within a predetermined threshold-value range being set in advance, or comprises a routine for distinguishably determining the presence or the absence of the welding abnormality of an electric charging contactor among the pair of electric charging contactors, or a contact defect thereof on a one-by-one basis corresponding to at least a combination state of a drive instruction with respect to the pair of electric charging contactors, and a detection logic of the main voltage detection signal, or a detection logic of the first voltage detection signal and that of the second voltage detection signal;

a plug cover configured to be mounted on a plug-in entrance of the electric charging plug; and based on the welding abnormality not being detected in the pair of main electric contactors and the pair of electric charging contactors, the plug cover is released while the electric charging plug is not inserted and one pair from among the pair of main electric contactors and the pair of electric charging contactors is configured not to be driven for close-circuiting, and, based on the welding abnormality being detected in any one contactor of pair of main electric contactors and the pair of electric charging contactors, a close-circuit instruction is prohibited with respect to at least another pair from among the pair of main electric contactors and the pair of electric charging contactors.

2. The electric charging control device as set forth in claim 1, wherein said voltage monitoring circuitry redundantly comprises the first voltage monitoring circuit connected between the upstream power-supply point and the downstream power-supply point, for producing the first voltage detection signal, and the second voltage monitoring circuit connected therebetween, for producing the second voltage detection signal; and the upper-level control CPU further executes the control program to perform a detection-circuit abnormality determination routine executed in cooperation with the electric charging control CPU, wherein the detection-circuit abnormality determination routine compares, in a first power-supply state in which the electric charging plug is not inserted and the pair of main electric contactors is close-circuited, or in a second power-supply state in which the pair of main electric contactors is open-circuited and electric power is supplied from the electric charging power-source apparatus after the electric charging plug is inserted, determination results at three points with one another by means of the main voltage detection signal, and the first voltage detection signal and the second voltage detection signal, each related to a presence or an absence of a respective point's detection voltage in accordance with the pair of electric charging contactors which is together open-circuited and then close-circuited;

the detection-circuit abnormality determination routine determines that the voltage-level detection circuit is abnormal, when the first voltage detection signal and the second voltage detection signal both indicate presences of voltage detection and when the main voltage detection signal indicates an absence of voltage detection, or when the first voltage detection signal and the second voltage detection signal both indicate absences of voltage detection and when the main voltage detection signal indicates a presence of voltage detection; and a close-locking mechanism operates to prohibit releasing the plug cover to be open, or at least an open-caution notification means is provided, when the welding abnormality of a main electric contactor is detected by the main contactor abnormality detection routine.

3. The electric charging control device as set forth in claim 2, wherein a positive-side input terminal of the first voltage monitoring circuit is connected to the upstream power-supply point by way of a first upstream connection line, and a negative-side input terminal thereof is connected to the downstream power-supply point by way of a first downstream connection line;

a positive-side input terminal of the second voltage monitoring circuit is connected to the upstream power-supply point via a second upstream connection line, and a negative-side input terminal thereof is connected to the downstream power-supply point via a second downstream connection line;

one end of the first upstream connection line and one end of the second upstream connection line are inputted into a first comparator circuit via respective positive-side connection capacitors;

one end of the first downstream connection line and one end of the second downstream connection line are inputted into a second comparator circuit via respective negative-side connection capacitors;

a first high-frequency signal voltage and a second high-frequency signal voltage are applied to a positive-side input terminal of the first comparator circuit and that of the second comparator circuit via a first oscillator circuit and a second oscillator circuit, respectively;

with respect to a short-circuit state in which, under a normal operating condition, the positive-side input terminal of the first comparator circuit and the negative-side input terminal thereof are short-circuited to each other via one of said respective positive-side connection capacitors, the first upstream connection line, the second upstream connection line and the other of said respective positive-side connection capacitors, a first disconnection detection signal is produced when the short-circuit state between the positive-side input terminal of the first comparator circuit and the negative-side input terminal thereof is disengaged because the first upstream connection line or the second upstream connection line is disconnected; and, with respect to a short-circuit state in which, under a normal operating condition, the positive-side input terminal of the second comparator circuit and the negative-side input terminal thereof are short-circuited to each other via one of said respective negative-side connection capacitors, the first downstream connection line, the second downstream connection line and the other of said respective negative-side connection capacitors, a second disconnection detection signal is produced when the short-circuit state between the positive-side input terminal of the second comparator circuit and the negative-side input terminal thereof is disengaged because the first downstream connection line or the second downstream connection line is disconnected.

4. The electric charging control device as set forth in claim 2, wherein the voltage-level detection circuit is utilized in place of at least one of the first voltage monitoring circuit and the second voltage monitoring circuit;

the generated voltage of the electric charging power-source apparatus is detected by the voltage-level detection circuit, when the electric charging plug is inserted; and a voltage abnormality determination processing means is comprised in which, in cooperation between the upper-level control CPU and the electric charging control CPU, determination is made whether or not the generated voltage of the electric charging power-source apparatus is within a range of a predetermined setting threshold-value voltage being set in advance, and a close-circuit drive of the pair of electric charging contactors is prohibited, when the generated voltage of the electric charging power-source apparatus is abnormal.

5. The electric charging control device as set forth in claim 3, wherein the voltage-level detection circuit is utilized in place of at least one of the first voltage monitoring circuit and the second voltage monitoring circuit;

the generated voltage of the electric charging power-source apparatus is detected by the voltage-level detection circuit, when the electric charging plug is inserted; and a voltage abnormality determination processing means is comprised in which, in cooperation between the upper-level control CPU and the electric charging control CPU, determination is made whether or not the generated voltage of the electric charging power-source apparatus is within a range of a predetermined setting threshold-value voltage being set in advance, and a close-circuit drive of the pair of electric charging contactors is prohibited, when the generated voltage of the electric charging power-source apparatus is abnormal.

6. The electric charging control device as set forth in claim 1, wherein said voltage monitoring circuitry comprises the first voltage monitoring circuit connected between the upstream power-supply point and the downstream midpoint in a crossing manner with respect to the second voltage monitoring circuit, for producing the first voltage detection signal, and the second voltage monitoring circuit connected between the downstream power-supply point and the upstream midpoint in a crossing manner with respect to the first voltage monitoring circuit, for producing the second voltage detection signal; and the upper-level control CPU further executes the control program to perform a detection-circuit abnormality determination routine executed in cooperation with the electric charging control CPU, wherein the detection-circuit abnormality determination routine compares, in a first power-supply state in which the electric charging plug is not inserted and the pair of main electric contactors is close-circuited, or in a second power-supply state in which the pair of main electric contactors is open-circuited and electric power is supplied from the electric charging power-source apparatus after the electric charging plug is inserted, determination results at three points with one another by means of the determination-voltage detection signal or the main voltage detection signal, and the first voltage detection signal and the second voltage detection signal, each related to a presence or absence of a respective point's detection voltage in accordance with the pair of electric charging contactors which is together open-circuited and then close-circuited;

the detection-circuit abnormality determination routine determines that the voltage-level detection circuit is abnormal, when the first voltage detection signal and the second voltage detection signal both indicate presences of voltage detection and when the determination-voltage detection signal or the main voltage detection signal indicates an absence of voltage detection, or when the first voltage detection signal and the second voltage detection signal both indicate absences of voltage detection and when the determination-voltage detection signal or the main voltage detection signal indicates a presence of voltage detection; and a close-locking mechanism operates to prohibit releasing the plug cover to be open, or at least an open-caution notification means is provided, when the welding abnormality of the main electric contactor or an electric charging contactor is detected by the main contactor abnormality detection routine or the first electric charging contactor abnormality detection routine, respectively.

7. The electric charging control device as set forth in claim 1, wherein the first voltage monitoring circuit and the second voltage monitoring circuit each comprise a plurality of series connected current-limiting resistors and a constant-voltage diode which are connected between a positive power-source line subjected to monitoring and a negative power-source line subjected thereto, wherein a light-emitting diode of a reception photocoupler is connected through a series resistor and in parallel with respect to the constant-voltage diode, and a smoothing capacitor is connected in parallel with the light-emitting diode or to the constant-voltage diode; and the first voltage detection signal or the second voltage detection signal is produced by a transistor output of the reception photocoupler.

8. The electric charging control device as set forth in claim 1, wherein the first voltage monitoring circuit and the second voltage monitoring circuit each comprise a plurality of series connected current-limiting resistors, a constant-voltage diode and a transmission photocoupler which are connected between a positive power-source line subjected to monitoring and a negative power-source line subjected thereto, wherein a light-emitting diode of a reception photocoupler is connected through a series resistor and in parallel with respect to the constant-voltage diode, and a smoothing capacitor is connected in parallel with the light-emitting diode or to the constant-voltage diode;

the transmission photocoupler is driven to switch on by a first reference signal or a second reference signal in which the electric charging control CPU produces, when voltage monitoring is performed thereby; and the first voltage detection signal or the second voltage detection signal is produced by a transistor output of the reception photocoupler.

9. The electric charging control device as set forth in claim 1, wherein the voltage-level detection circuit comprises a circuit for producing any one of the main voltage detection signal, the first voltage detection signal and the second voltage detection signal, and the voltage-level detection signal, or comprises a circuit for producing only the voltage-level detection signal which is inputted into the electric motor control CPU or the electric charging control CPU where the electric motor control CPU or the electric charging control CPU produces digital data of a currently going value of a detected voltage, so that a presence or absence of the detected voltage is determined by comparing the digital data with a predetermined threshold value being set in advance, and that the determination-voltage detection signal is obtained; and the voltage-level detection signal is made as an analog signal voltage which is proportional to the detected voltage, or as a pulse signal voltage whose pulse duty or pulse period changes in response to the detected voltage.

10. The electric charging control device as set forth in claim 9, wherein the voltage-level detection circuit comprises a comparison circuit to which a stable power-source voltage is applied by means of a plurality of series connected current-limiting resistors and a constant-voltage circuit including a constant-voltage diode which are connected between a positive power-source line subjected to detection and a negative power-source line thereto, and further comprises an intermittent control transistor, an electric charging reactor and a smoothing capacitor connected in series with one another, and the plurality of series connected current-limiting resistors connected in series therewith, which are connected between the positive power-source line and the negative power-source line, wherein the smoothing capacitor is connected in parallel with a series-connected circuit constituting of a light-emitting diode of a reception photocoupler and of an electrical discharge resistor, or with the electrical discharge resistor, and with negative feedback voltage-divider resistors;

a voltage generated downstream of the negative feedback voltage-divider resistors and a voltage generated downstream of voltage-divider resistors with respect to a stable power-source voltage applied to comparison input terminals of the comparison circuit, so that, by means of a comparison output thereof, the intermittent control transistor is intermittently controlled, and a negative feedback control is performed so that an electric charging voltage of the smoothing capacitor is in a relationship proportional to a stable power-source voltage;

a light-emitting diode of an intermittent reception photocoupler is connected between an interconnection point of the intermittent control transistor and the electric charging reactor, and the negative power-source line being a negative side of the constant-voltage circuit;

the light-emitting diode of the intermittent reception photocoupler is a light-emitting diode which produces, in a switch-off time-period of the intermittent control transistor, the voltage-level detection signal being a pulse signal voltage in such a manner that an induced current of the electric charging reactor flows back by way of the smoothing capacitor, so that a conduction duty or conduction period being a ratio of a switch-on time-period of the voltage-level detection signal to a switch-on/switch-off period thereof changes in response to a currently going voltage between the positive power-source line and the negative power-source line; and said main voltage detection signal is produced, when the reception photocoupler is included, by a transistor output thereof.

* * * * *